US011282268B1

(12) United States Patent
Palmer

(10) Patent No.: US 11,282,268 B1
(45) Date of Patent: Mar. 22, 2022

(54) TOP-DOWN VIEW MAPPING OF INTERIOR SPACES

(71) Applicant: Flyreel, Inc., Denver, CO (US)

(72) Inventor: Victor Palmer, College Station, TX (US)

(73) Assignee: Flyreel, Inc., Denver, CO (US)

( * ) Notice: Subject to any disclaimer, the term of this patent is extended or adjusted under 35 U.S.C. 154(b) by 0 days.

(21) Appl. No.: 17/512,535

(22) Filed: Oct. 27, 2021

(51) Int. Cl.
  *G06T 17/00* (2006.01)
  *G06T 7/50* (2017.01)
  *G06T 19/00* (2011.01)
  *G06T 7/12* (2017.01)

(52) U.S. Cl.
  CPC ............ *G06T 17/00* (2013.01); *G06T 7/12* (2017.01); *G06T 7/50* (2017.01); *G06T 19/006* (2013.01); *G06T 2200/04* (2013.01); *G06T 2200/08* (2013.01); *G06T 2207/10028* (2013.01)

(58) Field of Classification Search
  CPC .. G06T 17/00; G06T 7/12; G06T 7/50; G06T 19/006; G06T 2200/04; G06T 2200/08; G06T 2207/10028
  See application file for complete search history.

(56) References Cited

U.S. PATENT DOCUMENTS

| 2004/0105090 A1* | 6/2004 | Schultz | G06T 11/203 |
| | | | 356/141.5 |
| 2018/0144493 A1* | 5/2018 | Mulukutla | G06T 17/20 |
| 2021/0065461 A1* | 3/2021 | Reif | G06T 15/20 |

* cited by examiner

*Primary Examiner* — Siamak Harandi
(74) *Attorney, Agent, or Firm* — Perkins Coie LLP

(57) ABSTRACT

Introduced here are computer programs and associated computer-implemented techniques for generating top-down models of interior spaces based on analysis of digital images of those interior spaces. These computer programs may permit individuals to utilize conventional computing devices to record imagery of interior spaces for the purpose of depth mapping (also referred to as "height mapping"). The end result—namely, the top-down models—may be similar to the digital elevation models that are commonly generated to represent elevation.

20 Claims, 25 Drawing Sheets
(20 of 25 Drawing Sheet(s) Filed in Color)

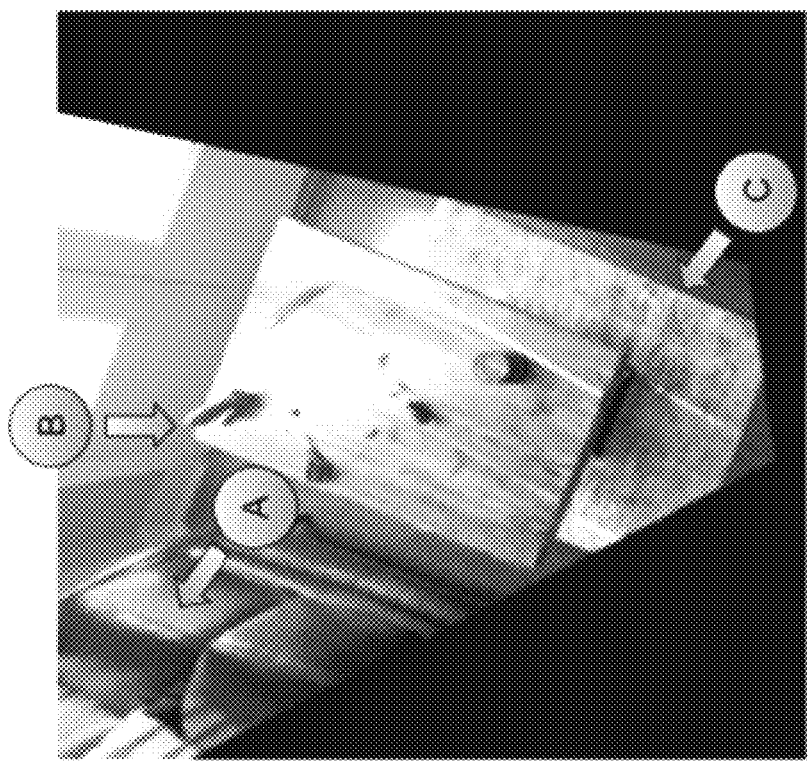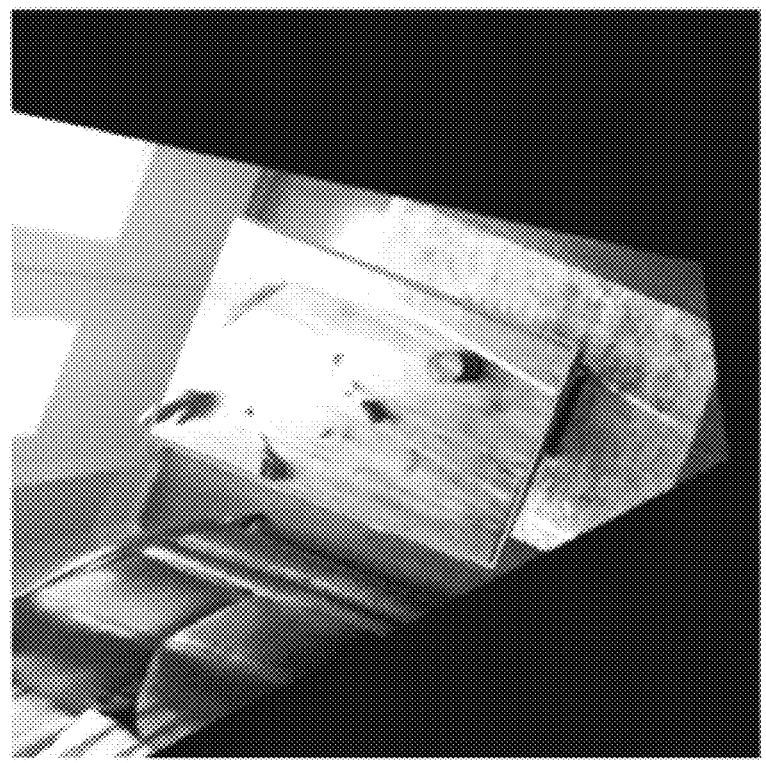
FIGURE 7

1000

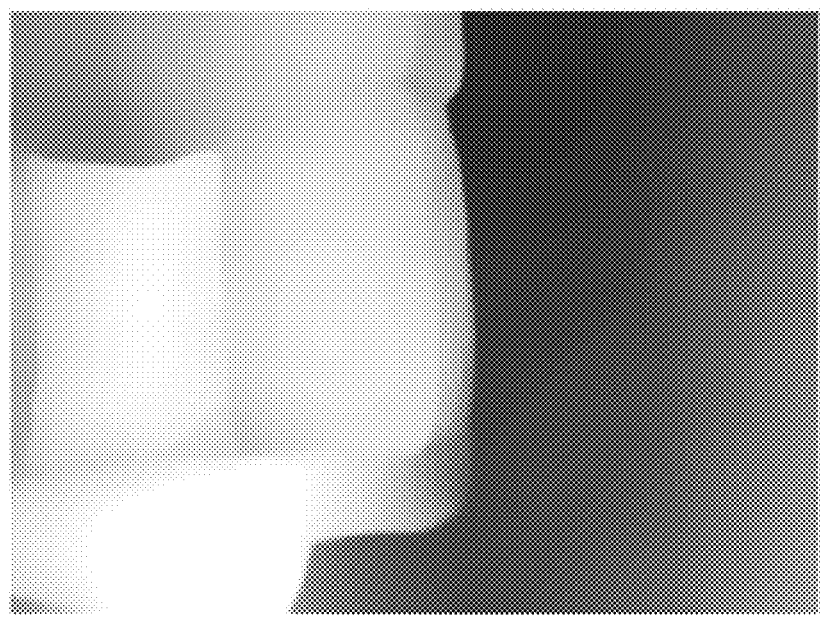
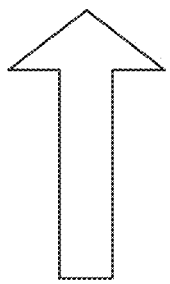
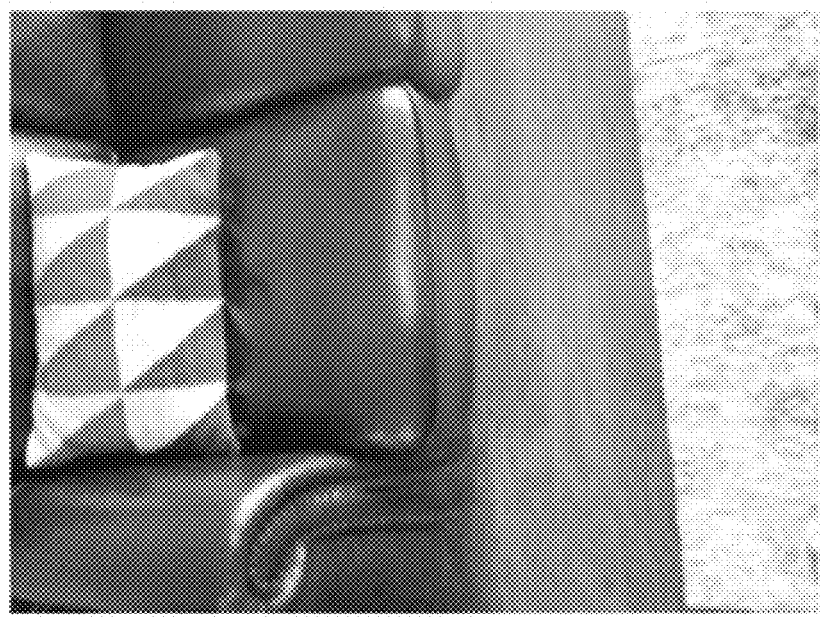
FIGURE 15

1800
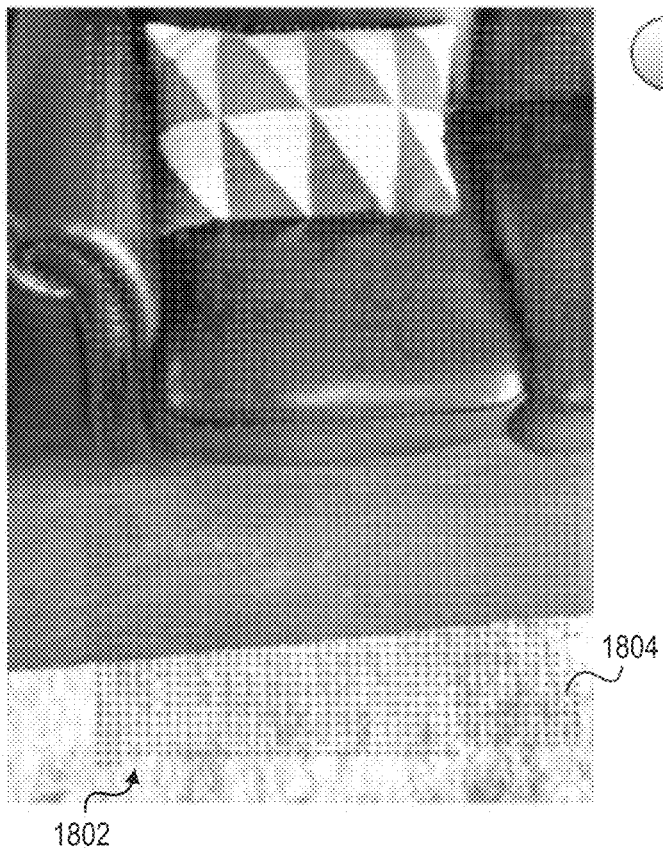
Points in point cloud generated through stereo technique. Each point may have coordinates (e.g., x-, y-, and z-coordinates).
1804
1802
FIGURE 18

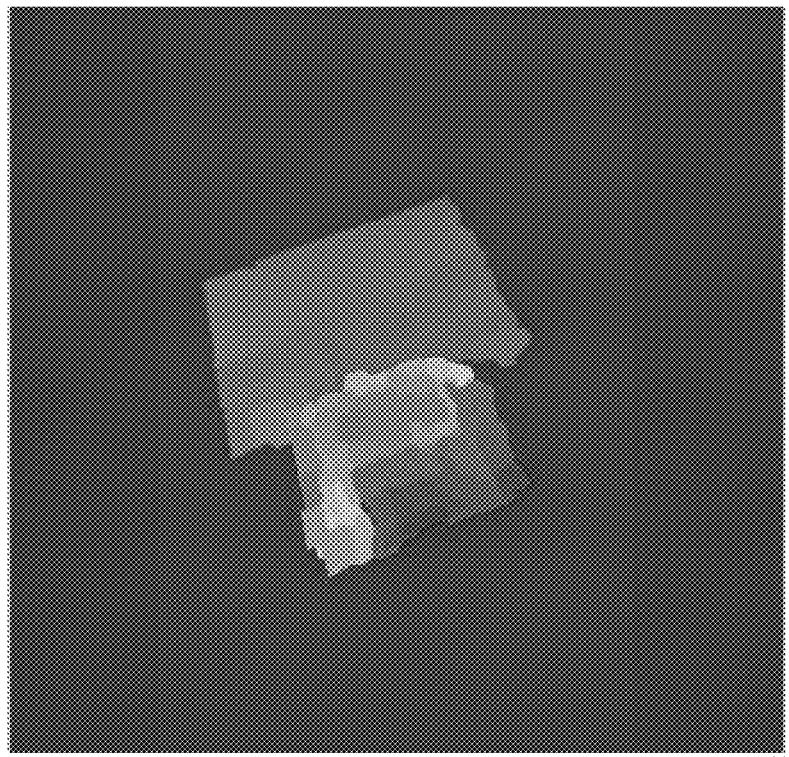
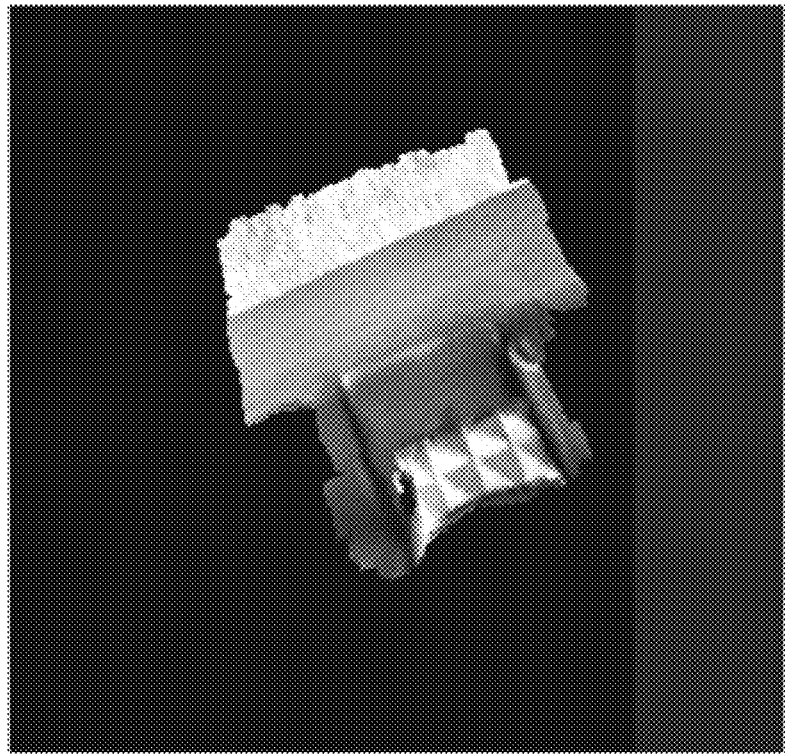
FIGURE 21

2200

2201
Receive input that is indicative of a request to generate a top-down view of an interior space using a computing device 2202
Instruct a user to pan the computing device across the interior space, so as to generate a pair of images 2203
Obtain a first point cloud by providing the first image to an augmented reality (AR) framework executing on the computing device 2204
Obtain a second point cloud by providing the second image to the AR framework executing on the computing device 2205
Generate a third point cloud by monitoring movement of an array of points across the first and second images 2206
Divide the first image into facets, so as to generate a faceted image 2207
Estimate a height of each facet in the faceted image based on the first and third point clouds 2208
Identify facets in the faceted image for which confidence in the estimated height exceeds a threshold 2209
Determine a homography for each identified facet based on the estimated height 2210
Project pixels of each identified facet onto an overhead depth elevation model (DEM) based on the homographies, so as to generate the top-down view of the interior space

2301
Receive input that is indicative of a request to generate a top-down view of an interior space using a computing device 2302
Instruct a user to pan the computing device across the interior space, so as to generate a series of images 2303
Obtain a first series of point clouds by providing the series of images to an augmented reality (AR) framework executing on the computing device 2304
Obtain a second series of point clouds by monitoring movement of an array of points across successive images 2305
Divide each image in the series of images into facets, so as to generate a series of faceted images 2306
Estimate a height of each facet in each faceted image based on (i) the corresponding point cloud in the first series of point clouds and (ii) the corresponding point cloud in the second series of point clouds 2307
Project at least some pixels included in each faceted image onto an overhead depth elevation model (DEM), so as to generate the top-down view of the interior space

FIGURE 23

TOP-DOWN VIEW MAPPING OF INTERIOR SPACES

TECHNICAL FIELD

Various embodiments concern computer programs and associated computer-implemented techniques for generating realistic photographic views of an interior space from above through analysis of digital images of the interior space.

BACKGROUND

For individuals interested in constructing, inspecting, and remodeling physical structures, it is often useful to have a top-down view (also referred to as an "overhead view") of the interior spaces of interest. Blueprints and floorplans are helpful, but these representations capture what the corresponding interior spaces should look like, rather than what the corresponding interior spaces actually look like. Said another way, these representations do not capture the current condition (also referred to as the "ground truth") of the corresponding interior spaces. What is desired for a given interior space, is a photographic view from above that shows the given interior space as if a digital image had been captured after the roof and ceiling were removed.

There are several approaches that have traditionally been used to develop top-down views of interior spaces.

One approach involves capturing a dense three-dimensional (3D) set of data points that represents the features of an interior space. This set of data points may be referred to as a "point cloud." Light Detection and Ranging (LiDAR) systems are commonly used to record point clouds by establishing, through the use of lasers, coordinates for various points. Ideally, these points should correspond to the surface of the interior space—namely, its walls, floor, and ceiling—though points may also correspond to the surface of objects contained in the interior space. Using a point cloud, a computer program can reconstruct the interior space from a top-down perspective since the heights of different surfaces can be computed, inferred, or otherwise established based on the coordinates of different points included in the point cloud.

Another approach involves generating a series of red-green-blue (RGB) digital images of an interior space from different positions and orientations. To generate a point cloud, a computer program may employ a simultaneous localization and mapping (SLAM) algorithm that is designed to construct a representation of the interior space based on an analysis of the RGB digital images.

These approaches represent notable advancements in the field of spatial mapping through computer vision. However, these approaches are largely unsuitable for obtaining top-down views of interior spaces. While LiDAR systems are becoming increasingly common, LiDAR systems are still not generally available. In fact, most individuals who are trying to establish the dimensions of interior spaces will only have access to conventional measurement implements (e.g., tape measures and yardsticks) and conventional computing devices (e.g., mobile phones and tablet computers). Meanwhile, SLAM-sourced point clouds are relatively sparse, and therefore are not well suited for use in establishing the heights of different surfaces with high accuracy and precision.

BRIEF DESCRIPTION OF THE DRAWINGS

This patent or application publication contains at least one drawing executed in color. Copies of this patent or application publication with color drawings will be provided by the Office upon request and payment of the necessary fee.

FIG. 7 illustrates how a homography may only be correct for flat surfaces at a single height.

FIG. 15 illustrates how depth may be estimated by the inspection platform for an image of a scene.

FIG. 18 illustrates how the inspection platform can generate a dense point cloud for an image using depth-from-stereo techniques.

FIG. 21 illustrates how the pixels of the trusted facets can be projected onto an overhead DEM to generate a top-down view of a scene, as well as how a single scalar value can be projected instead of the pixels to generate a depth map of the scene.

FIG. 22 includes a flow diagram of a process for generating a top-down view of an interior space by projecting pixels onto an overhead DEM.

FIG. 23 includes a flow diagram of a process for sequentially examining images of an interior space in order to iteratively develop a top-down view of the interior space.

Figure 1:
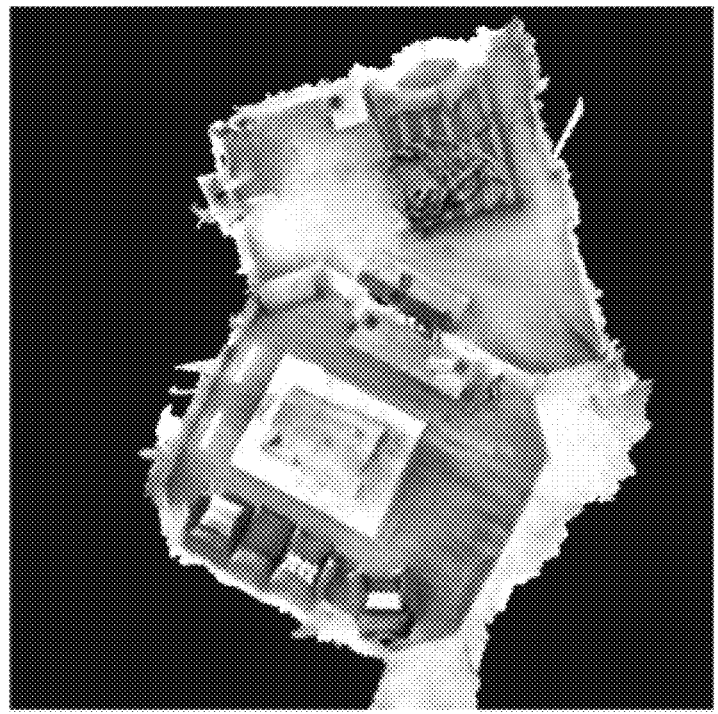
FIG. 1 includes an example of a top-down model generated for a pair of interior spaces that are interconnected via an adjoining wall.

Various features of the technology described herein will become more apparent to those skilled in the art from a study of the Detailed Description in conjunction with the drawings. Various embodiments are depicted in the drawings for the purpose of illustration. However, those skilled in the art will recognize that alternative embodiments may be employed without departing from the principles of the technology. Accordingly, although specific embodiments are shown in the drawings, the technology is amenable to various modifications.

DETAILED DESCRIPTION

There are many situations where individuals may be interested in generating top-down views of interior spaces. For example, an individual may be interested in generating a top-down view of an interior space that is located inside a physical structure to be constructed, inspected, appraised, or remodeled. Note that the term "interior space" may refer to a three-dimensional (3D) space that is enclosed by a floor, ceiling, and walls. An interior space need not be completely bounded by walls on all sides, as the teachings of the present disclosure can be applied to interior spaces that are partially or fully enclosed by walls.

However, these individuals typically do not have access to sophisticated equipment (e.g., LiDAR systems), and therefore conventional approaches to developing top-down views of interior spaces tend to be impractical or impossible to implement. In fact, these individuals generally only have access to conventional computing devices and conventional measurement implements.

Introduced here, therefore, are computer programs that are able to generate textured, dimensioned top-down models of interior spaces based on analysis of digital images (or simply "images") of those interior spaces. FIG. 1 includes an example of a top-down model generated for a pair of interior spaces that are interconnected via an adjoining wall. As further discussed below, these computer programs may permit individuals to utilize conventional computing devices to record imagery of interior spaces for the purpose of depth mapping (also referred to as "height mapping"). The end result—namely, the top-down models—should preferably be similar to the digital elevation models (DEMs) that are commonly generated to represent elevation (e.g., of terrain). Accordingly, the computer programs described herein may be able to generate DEMs for interior spaces based on an analysis of images of those interior spaces.

As an example, assume that a computer program executing in a computing device receives input that is representative of a request to generate a top-down view of an interior space. Normally, this input will correspond to a user either initiating (i.e., opening) the computer program or interacting with the computer program in such a manner so as to indicate that she is interested in generating the top-down view. For example, the user may interact with a digital element labeled "Generate Top-Down View" or "Create Elevation Model" that is viewable on an interface generated by the computer program. Thereafter, the computer program may instruct the user to pan a camera of the computing device across the interior space, so as to generate a series of images of the interior space.

As discussed in greater detail below, the height of planar surfaces in the interior space can be intelligently determined based on an analysis of different point clouds. For each image generated by the camera, the computer program can obtain a pair of point clouds, namely, a first point cloud and a second point cloud. To obtain the first point cloud, the computer program can provide the image to an augmented reality (AR) framework that produces the first point cloud as output. Meanwhile, the second point cloud can be obtained by monitoring movement of an array of points across images. Each point in the first point cloud may not be associated with a corresponding point in second point cloud, or vice versa. For example, the second point cloud may be denser than the first point cloud. However, the first and second point clouds can be useful in estimating the height of planar surfaces since (i) each point is representative of a depth estimate and (ii) the depth estimates are determined in different ways for the first and second point clouds. Note that the term "depth estimate" may be used interchangeably with the term "height estimate."

Another important aspect of the approach involves accurately identifying the planar surfaces to be mapped onto the top-down view of the interior space. To accomplish this, the computer program may divide each digital image into faceted regions (also referred to as "facets") as discussed in greater detail below. Each facet can include pixels that are determined to correspond to a comparable height relative to the camera of the computing device.

For each facet in each digital image, the computer program can estimate the height based on the first and second point clouds. Accordingly, the computer program may estimate the heights of regions of pixels that collectively form each digital image. In some embodiments, the computer program then identifies the facets for which confidence in the height exceeds a threshold, so as to ensure that only those facets whose height is likely to be accurate are mapped onto the top-down view of the interior space. For each identified facet, the computer program can determine a homography based on the height and then project the pixels onto the top-down view of the interior space based on the homography. At a high level, the homography may be representative of an isomorphism (also referred to as a "function") that specifies how the pixels should be mapped from the source (i.e., the digital image) to the top-down view of the interior space.

For the purpose of illustration, embodiments may be described in the context of generating DEMs for interior spaces. However, features of those embodiments may be similarly applicable to generating DEMs for exterior spaces. While the term "interior space" may be used to refer to a physical space that is internal to a physical structure of interest, the term "exterior space" may be used to refer to a physical space that is external to the physical structure of interest. Examples of exterior spaces include driveways, decks, and the like.

Moreover, embodiments may be described in the context of executable instructions for the purpose of illustration. However, those skilled in the art will recognize that aspects of the technology could be implemented via hardware, firmware, or software. As an example, a computer program that is representative of a software-implemented inspection platform (or simply "inspection platform") designed to facilitate imaging and measuring of interior spaces may be executed by the processor of a computing device. This computer program may interface, directly or indirectly, with hardware, firmware, or other software implemented on the computing device.

Terminology

References in the present disclosure to "an embodiment" or "some embodiments" mean that the feature, function, structure, or characteristic being described is included in at least one embodiment. Occurrences of such phrases do not necessarily refer to the same embodiment, nor are they necessarily referring to alternative embodiments that are mutually exclusive of one another.

The term "based on" is to be construed in an inclusive sense rather than an exclusive sense. That is, in the sense of "including but not limited to." Thus, unless otherwise noted, the term "based on" is intended to mean "based at least in part on."

The terms "connected," "coupled," and variants thereof are intended to include any connection or coupling between two or more elements, either direct or indirect. The connection or coupling can be physical, logical, or a combination thereof. For example, elements may be electrically or communicatively coupled to one another despite not sharing a physical connection.

The term "module" may refer broadly to software, firmware, hardware, or combinations thereof. Modules are typically functional components that generate one or more outputs based on one or more inputs. A computer program may include or utilize one or more modules. For example, a computer program may utilize multiple modules that are responsible for completing different tasks, or a computer program may utilize a single module that is responsible for completing all tasks.

When used in reference to a list of multiple items, the word "or" is intended to cover all of the following interpretations: any of the items in the list, all of the items in the list, and any combination of items in the list.

Overview of Inspection Platform

Figure 2:
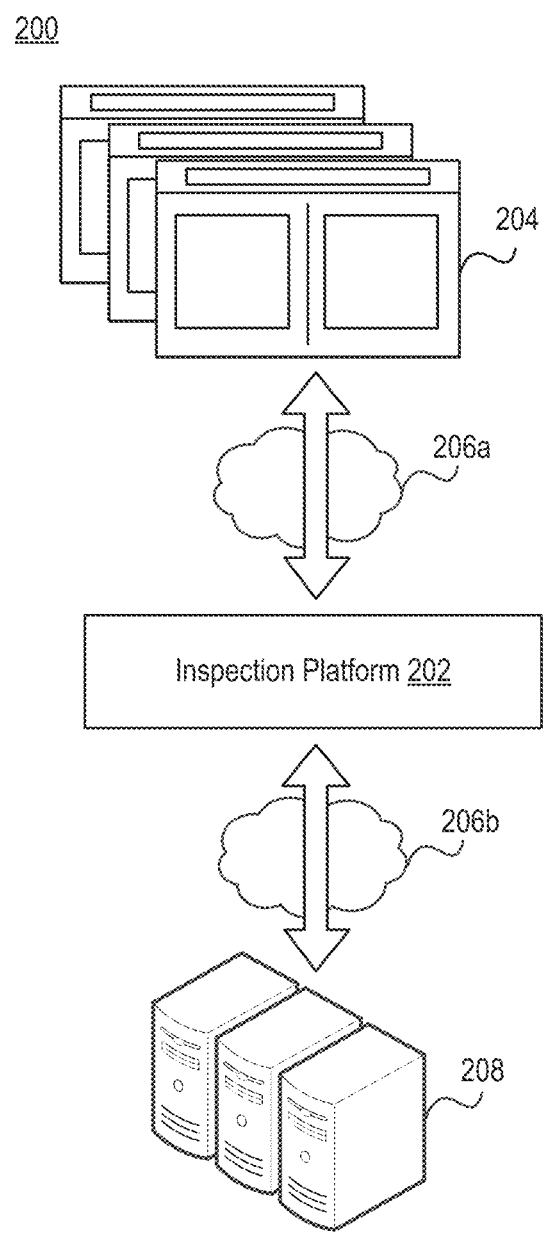
FIG. 2 illustrates a network environment that includes an inspection platform.

FIG. 2 illustrates a network environment 200 that includes an inspection platform 202. Individuals (also referred to as "users") can interface with the inspection platform 202 via interfaces 204. For example, a user may be able to access an interface through which information regarding an interior space can be input. For instance, the user may specify the name of an interior space for which a top-down model is to be generated, or the user may provide information regarding the interior space (e.g., type, contents, construction materials). As another example, a user may be able to access an interface through which feedback is provided as images of an interior space are generated. These interfaces 104 may also permit users to view 2D and 3D representations of interior spaces, as well as manage preferences. The term "user," as used herein, may refer to a homeowner, business owner, assessor insurance adjuster (also referred to as a "claims adjuster"), or another individual with an interest in generating a top-down view of an interior space.

As shown in FIG. 2, the inspection platform 202 may reside in a network environment 200. Thus, the computing device on which the inspection platform 202 is implemented may be connected to one or more networks 206a-b. These networks 206a-b may be personal area networks (PANs), local area networks (LANs), wide area networks (WANs), metropolitan area networks (MANs), cellular networks, or the Internet. Additionally or alternatively, the inspection platform 202 can be communicatively coupled to one or more computing devices over a short-range wireless connectivity technology, such as Bluetooth®, Near Field Communication (NFC), Wi-Fi® Direct (also referred to as "Wi-Fi P2P"), and the like.

The interfaces 204 may be accessible via a web browser, desktop application, mobile application, or over-the-top (OTT) application. For example, in order to complete a guided modeling operation further described below, a user may access an interface that is generated by a mobile application executing on a mobile phone. This interface may also be accessible via the web browser executing on the mobile phone. Accordingly, the interfaces 204 may be viewed on a mobile phone, a tablet computer, a wearable electronic device (e.g., a watch or fitness accessory), or a virtual or augmented reality system (e.g., a head-mounted display).

In some embodiments, at least some components of the inspection platform 202 are hosted locally. That is, part of the inspection platform 202 may reside on the computing device that is used to access the interfaces 204. For example, the inspection platform 202 may be embodied as a mobile application that is executable by a mobile phone. Note, however, that the mobile application may be communicatively connected to a server system 208 on which other components of the inspection platform 202 are hosted.

In other embodiments, the inspection platform 202 is executed entirely by a cloud computing service operated by, for example, Amazon Web Services®, Google Cloud Platform™, or Microsoft Azure®. In such embodiments, the inspection platform 202 may reside on a server system 208 that is comprised of one or more computer servers. These computer server(s) can include different types of data (e.g., images, point clouds, dimensions of interior spaces), algorithms for processing the data, interior space information (e.g., type, contents, construction materials), structure information (e.g., address, construction date, insurance provider), and other assets. Those skilled in the art will recognize that this information could also be distributed amongst the server system 208 and one or more computing devices. For example, some data that is generated by the computing device on which the inspection platform 202 resides may be stored on, and processed by, that computing device for security or privacy purposes.

Figure 3:
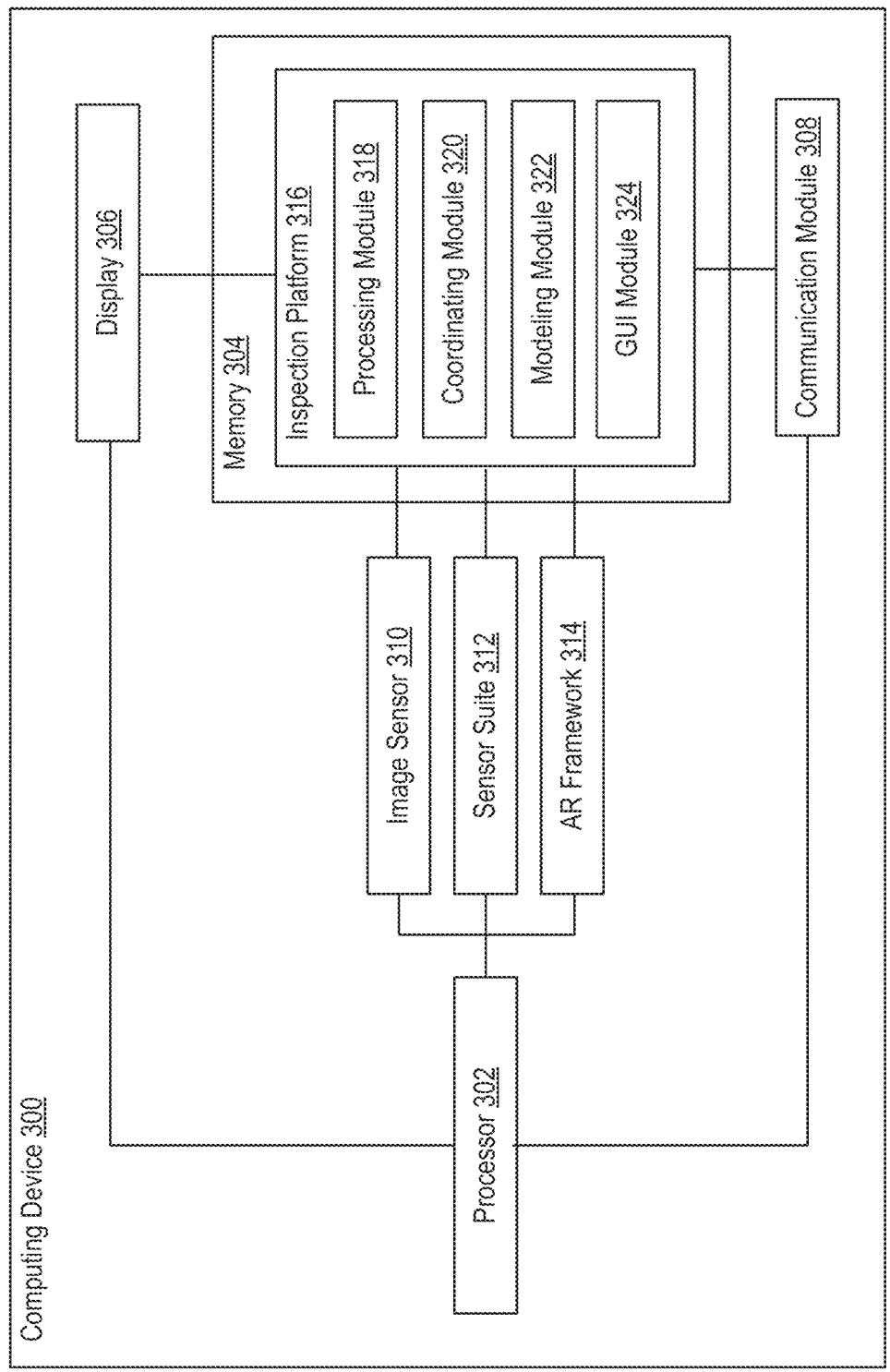
FIG. 3 illustrates an example of a computing device that is able to implement an inspection platform designed to generate a top-down model of an interior space using images of the interior space.

FIG. 3 illustrates an example of a computing device 300 that is able to implement an inspection platform 316 designed to generate a top-down model of an interior space using images of the interior space. These images may be generated by the computing device 300 while it is held in the horizontal or vertical orientation and then reoriented toward different portions of the interior space, so as to generate a series of images that collectively represent a wide view of the interior space. As further discussed below, these images can be acquired during a guided modeling operation in which a user is prompted to pan the computing device 300 across the interior space. Through analysis of the images, the inspection platform 316 may be able to establish the height of different planar surfaces in the interior space (and thus, determine how to map pixels corresponding to those planar surfaces to a top-down model of the interior space).

The computing device 300 can include a processor 302, memory 304, display 306, communication module 308, image sensor 310, and sensor suite 312. Each of these components is discussed in greater detail below. Those skilled in the art will recognize that different combinations of these components may be present depending on the nature of the computing device 300.

The processor 302 can have generic characteristics similar to general-purpose processors, or the processor 302 may be an application-specific integrated circuit (ASIC) that provides control functions to the computing device 300. As shown in FIG. 3, the processor 302 can be coupled to all components of the computing device 300, either directly or indirectly, for communication purposes.

The memory 304 may be comprised of any suitable type of storage medium, such as static random-access memory (SRAM), dynamic random-access memory (DRAM), electrically erasable programmable read-only memory (EEPROM), flash memory, or registers. In addition to storing instructions that can be executed by the processor 302, the memory 304 can also store data generated by the processor 302 (e.g., when executing the modules of the inspection platform 316). Note that the memory 304 is merely an abstract representation of a storage environment. The memory 304 could be comprised of actual memory integrated circuits (also referred to as "chips").

The display 306 can be any mechanism that is operable to visually convey information to a user. For example, the display 306 may be a panel that includes light-emitting diodes (LEDs), organic LEDs, liquid crystal elements, or electrophoretic elements. In some embodiments, the display 306 is touch sensitive. Thus, a user may be able to provide input to the inspection platform 316 by interacting with the display 306.

The communication module 308 may be responsible for managing communications between the components of the computing device 300, or the communication module 308 may be responsible for managing communications with other computing devices (e.g., server system 208 of FIG. 2). The communication module 308 may be wireless communication circuitry that is designed to establish communication channels with other computing devices. Examples of wireless communication circuitry include chips configured for Bluetooth, Wi-Fi, NFC, and the like.

The image sensor 310 may be any electronic sensor that is able to detect and convey information in order to generate images, generally in the form of image data or pixel data. Examples of image sensors include charge-coupled device (CCD) sensors and complementary metal-oxide semiconductor (CMOS) sensors. The image sensor 310 may be implemented in a camera module (or simply "camera") that is implemented in the computing device 300. In some embodiments, the image sensor 310 is one of multiple image sensors implemented in the computing device 300. For example, the image sensor 310 could be included in a front- or rear-facing camera on a mobile phone.

Other sensors may also be implemented in the computing device 300. Collectively, these sensors may be referred to as the "sensor suite" 312 of the computing device 300. For example, the computing device 300 may include a motion sensor whose output is indicative of motion of the computing device 300 as a whole. Examples of motion sensors include accelerometers and gyroscopes. In some embodiments, the motion sensor is implemented in an inertial measurement unit (IMU) that measures the force, angular rate, or orientation of the computing device 300. The IMU may accomplish this through the use of one or more accelerometers, one or more gyroscopes, one or more magnetometers, or any combination thereof. As another example, the computing device 300 may include a proximity sensor whose output is indicative of proximity of the computing device 300 to a nearest obstruction within the field of view of the proximity sensor. A proximity sensor may include, for example, an emitter that is able to emit infrared (IR) light and a detector that is able to detect reflected IR light that is returned toward the proximity sensor. These types of proximity sensors are sometimes called laser imaging, detection, and ranging (LiDAR) sensors. Note, however, that these proximity-type LiDAR sensors are different than the conventional LiDAR systems mentioned above. Generally, these proximity-type LiDAR sensors measure a single distance value (e.g., from the computing device 300 to a nearest object) while the conventional LiDAR systems measure many values simultaneously to form a 2D array of distance values. As another example, the computing device 300 may include an ambient light sensor whose output is indicative of the amount of light in the ambient environment.

In order to take advantage of the image sensor 310 and sensor suite 312, the computing device 300 may implement an augmented reality (AR) framework 314. The AR framework 314 is normally executed by the operating system of the computing device 300 rather than any individual computer programs executing on the computing device 300. The AR framework 314 can integrate (i) digital images that are generated by the image sensor 310 and (ii) outputs produced by one or more sensors included in the sensor suite 312 in order to determine the location of the computing device 300 in 3D space. At a high level, the AR framework 314 may perform motion tracking, scene capturing, and scene processing to establish the spatial position of the computing device 300 in real time. Generally, the AR framework 314 is accessible to computer programs executing on the computing device 300 via an application programming interface (API). Thus, the inspection platform 314 may be able to readily obtain point clouds from the AR framework 314 via the API as further discussed below.

For convenience, the inspection platform 316 is referred to as a computer program that resides within the memory 304. However, the inspection platform 314 could be comprised of software, firmware, or hardware that is implemented in, or accessible to, the computing device 300. In accordance with embodiments described herein, the inspection platform 316 may include a processing module 316, coordinating module 318, modeling module 320, and graphical user interface (GUI) module 322. Each of these modules can be an integral part of the inspection platform 316. Alternatively, these modules can be logically separate from the inspection platform 316 but operate "alongside" it. Together, these modules enable the inspection platform 316 to generate top-down models of an interior space, as well as objects contained therein, in an automated manner by guiding a user through a modeling operation.

The processing module 318 can process data obtained by the inspection platform 316 into a format that is suitable for the other modules. For example, the processing module 318 may apply operations to images generated by the image sensor 310 in preparation for analysis by the other modules of the inspection platform 316. Thus, the processing module 318 may despeckle, denoise, or otherwise filter images that are generated by the image sensor 310. Additionally or alternatively, the processing module 318 may adjust properties like contrast, saturation, and gain in order to improve the outputs produced by the other modules of the inspection platform 316. The processing module 318 may also process data obtained from the sensor suite 312 in preparation for analysis by the other modules of the inspection platform 316. Accordingly, the processing module 318 may be responsible for ensuring that the appropriate data is accessible to the other modules of the inspection platform 316.

The coordinating module 320 may be responsible for obtaining the point clouds that can be used to estimate the heights of substantially planar surfaces in the interior space of interest. As further discussed below, two different types of point clouds can be used to accomplish this.

Assume, for example, that a series of images is generated by the image sensor 310 as a user pans across an interior space of interest. In this situation, the coordinating module 320 can provide the series of images to the AR framework 314 as input, so as to obtain a first series of point clouds. These point clouds may be referred to as "AR-derived point clouds." Upon receiving a given image as input, the AR framework 314 may produce, as output, (i) a point cloud and (ii) a spatial coordinate that is indicative of the position of the image sensor 310 when the given image was generated. Thus, each point cloud included in the first series of point clouds may be associated with a corresponding image in the series of images generated by the image sensor 310.

Moreover, the coordinating module 320 can obtain a second series of point clouds by monitoring the movement of an array of points across successive images. Since the spatial coordinate of the image sensor 310 is known for each image (e.g., based on the output produced by the AR framework 314), the coordinating module 320 can employ depth-from-stereo approaches to estimate the location in 3D space of each point included in the array of points. Accordingly, these point clouds may be referred to as "depth-from-stereo point clouds" or "DFS point clouds." Each point cloud included in the second series of point clouds may be associated with a corresponding image in the series of images generated by the image sensor 310 (and thus, a corresponding point cloud in the first series of point clouds).

In addition to obtaining the first and second series of point clouds, the coordinating module 320 can divide each image in the series of images into facets as further discussed below. At a high level, each facet may be representative of a segment or group of pixels that are determined to correspond to a comparable height relative to the image sensor 310. With the first and second series of point clouds, the coordinating module 320 can estimate a height of each facet in each image in the series of images.

The modeling module 322 may be responsible for identifying the facets that should be projected onto a top-down model of the interior space and then determining how to project the identified facets. For example, the modeling module 322 may identify the facets for which confidence in the height estimated by the coordinating module 320 exceeds a threshold. Then, the modeling module 322 may determine a homography for each identified facet based on its height and then project the pixels of each identified facet onto the top-down model based on its homography.

The GUI module 324 may be responsible for generating interfaces that can be presented on the display 306. Various types of information can be presented on these interfaces. For example, information that is calculated, derived, or otherwise obtained by the coordinating module 320 and/or modeling module 322 may be presented on an interface for display to the user. As another example, visual feedback may be presented on an interface so as to indicate to the user whether the guided modeling procedure is being completed properly. For instance, the top-down model may be populated onto the interface and facets may be projected onto the top-down model in near real time, so as to indicate to the user which portions of the interior space have been properly or sufficiently imaged.

Overview of Approach to Generating Top-Down Models

Several operating systems, including the iOS operating system developed by Apple Inc. and the Android operating system developed by Google LLC among others, have made it easy to run an AR framework (also referred to as an "AR engine") even if the underlying computing device does not have a dedicated depth sensor (e.g., a LiDAR sensor). These AR frameworks are capable of tracking the position and orientation of a computing device as it moves in a 3D space. In addition to becoming increasingly ubiquitous, these AR frameworks have become increasingly straightforward to utilize (e.g., via APIs).

Figure 4A:
FIG. 4A includes an example of an image generated by a computing device.
Figure 4B:
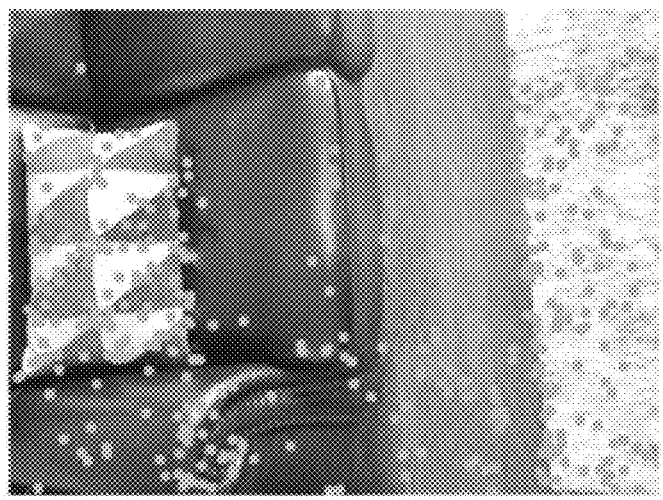
FIG. 4B illustrates how points can be distributed across the image for tracking purposes.

At a high level, an AR framework works by tracking and refining a set of points that serve as representative navigational landmarks throughout the ambient environment. FIG. 4A includes an example of an image generated by a computing device, and FIG. 4B illustrates how points can be distributed across the image for tracking purposes. This set of points (also referred to as a "point cloud") is generated as a byproduct of execution of the AR framework, and each point is associated with a spatial coordinate (e.g., using x-, y-, and z-coordinates of a defined coordinate system).

Oftentimes, these point clouds are discarded by the operating system. One reason for this is because other computer programs executing on the computing device generally do not have much use for these point clouds since there is no control over which points the AR framework will select as the navigational landmarks. Computer programs have historically not relied on these point clouds for estimating depth due to this lack of control. The depth estimates produced by an AR framework tend to be very accurate, however. As such, an inspection platform may use point clouds that are produced by an AR framework as one source of information about the 3D shape of an interior space.

While point clouds produced by an AR framework may be accurate, these point clouds may not be very dense. In FIG. 4B, for example, the points are not distributed evenly but instead tend to be clustered near variations in texture that are representative of visual discontinuities. Visual discontinuities tend to be overrepresented while depth discontinuities tend to be underrepresented. This can be seen in FIG. 4B, where the boundary between the couch and floor—which is representative of a depth discontinuity—is sparsely populated with points. To address this, the inspection platform can employ depth-from-stereo techniques (or simply "stereo techniques") to obtain another denser point cloud.

Figure 5B:
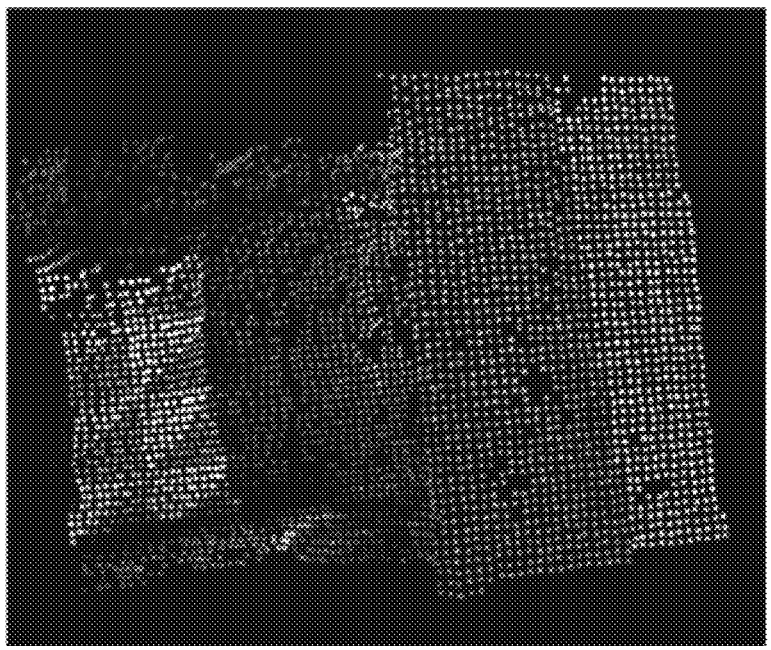
FIG. 5B illustrates how the points of the depth-from-stereo point cloud may be densely arranged when viewed from above.
Figure 5A:
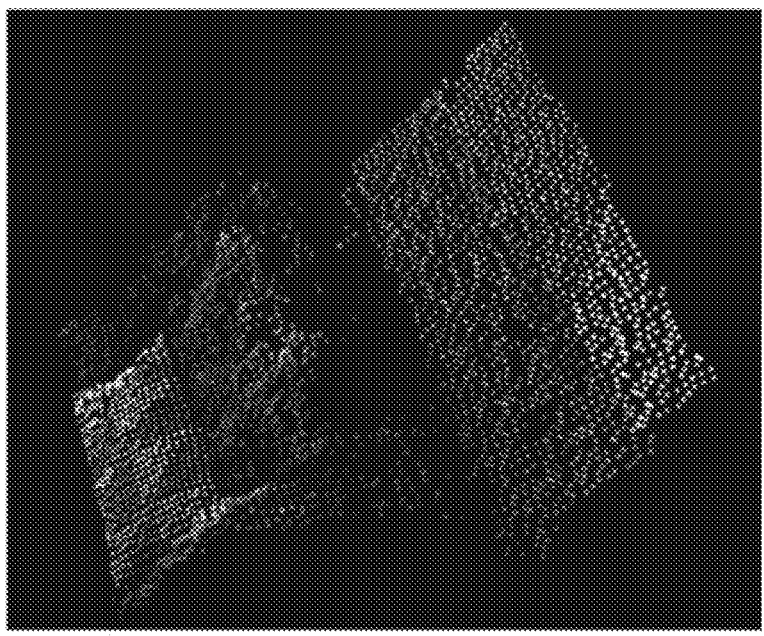
FIG. 5A includes an example of a depth-from-stereo point cloud from a side perspective view (i.e., as observed by the image sensor).

As mentioned above, when the inspection platform provides an image to the AR framework as input, the AR framework will produce two outputs, namely, (i) a point cloud that is relatively sparsely populated and (ii) a spatial coordinate that is indicative of the position of the computing device (and, more specifically, its image sensor) when the image was generated. Since the AR framework indicates the position of the image sensor, the inspection platform can identify a pair of images generated from different locations and then use the spatial positions estimated by the AR framework to obtain another point cloud (also referred to as a "depth-from-stereo point cloud") based on an array of points that the inspection platform elects to track between the pair of images. FIG. 5A includes an example of a depth-from-stereo point cloud from a side perspective view (i.e., as observed by the image sensor), and FIG. 5B illustrates how the points of the depth-from-stereo point cloud may be densely arranged when viewed from above. Generally, this array of points is relatively dense. For example, the points may be arranged in grid form at a high density (e.g., every pixel, every other pixel, or every third pixel).

Assuming that the inspection platform obtains a series of images generated over time, the inspection platform can examine the series of images in a pairwise manner—generating a depth-from-stereo point cloud for one image by comparing its content against a subsequent image—so as to generate a series of depth-from-stereo point clouds. These depth-from-stereo point clouds tend to be denser than those produced by the AR framework but may be less accurate than the points that the AR framework selects as navigational landmarks.

Regardless of whether the inspection platform uses the point cloud obtained from the AR framework or the point cloud generated using stereo techniques, the end result is a collection of points in 3D space. These point clouds could be used to create a DEM for the interior space, either individually or collectively, by simply rotating the points so that the point cloud(s) are rendered from a top-down perspective as shown in FIG. 5B. However, for the purposes of viewability, point clouds tend not to be particularly useful. There are gaps between the points, and users may be confused by the gaps. Simply put, a normal user of the inspection platform may not understand how to derive information regarding height from a top-down view of a point cloud. Users may also find the gaps between the points to be off-putting.

Therefore, the goal of the inspection platform is to create a largely continuous, textured model that covers the imaged portion of an interior space, knowing that (i) point clouds produced by AR frameworks tend to be sparser than point clouds generated using stereo techniques and (ii) point clouds generated using stereo techniques tend to be less accurate than point clouds produced by AR frameworks. In order to create a dense DEM as shown in FIG. 1, the inspection platform may need to either (i) sample points so densely that they effectively become continuous or (ii) mathematically infer a smooth surface over one of the point clouds mentioned above. Neither of these options is attractive. In many cases, there is not enough texture or detail to sample points densely enough to achieve an output without gaps between points. Meanwhile, inferring smooth surfaces over a set of points in 3D space is generally a difficult problem that often results in erroneous artifacts that can confuse or startle users. The approach described herein represents an alternative approach to creating dense DEMs.

Interestingly, a special case for constructing DEMs occurs when the inspection platform (i) wants to create an overhead DEM of a flat object, (ii) knows the position and orientation of the image sensor that generates a source image of the flat object, and (iii) knows the real-world height of the flat object. In this situation, because the object is substantially planar, the inspection platform is guaranteed to be able to exactly map pixels in the source image directly to the overhead DEM using a simple homography. Moreover, this homography may only be dependent on the relative vertical distance between the image sensor and the flat object. If the position of the image sensor is known, then the relative vertical distance may simply be the height of the image sensor minus the height of the object.

Figure 6:
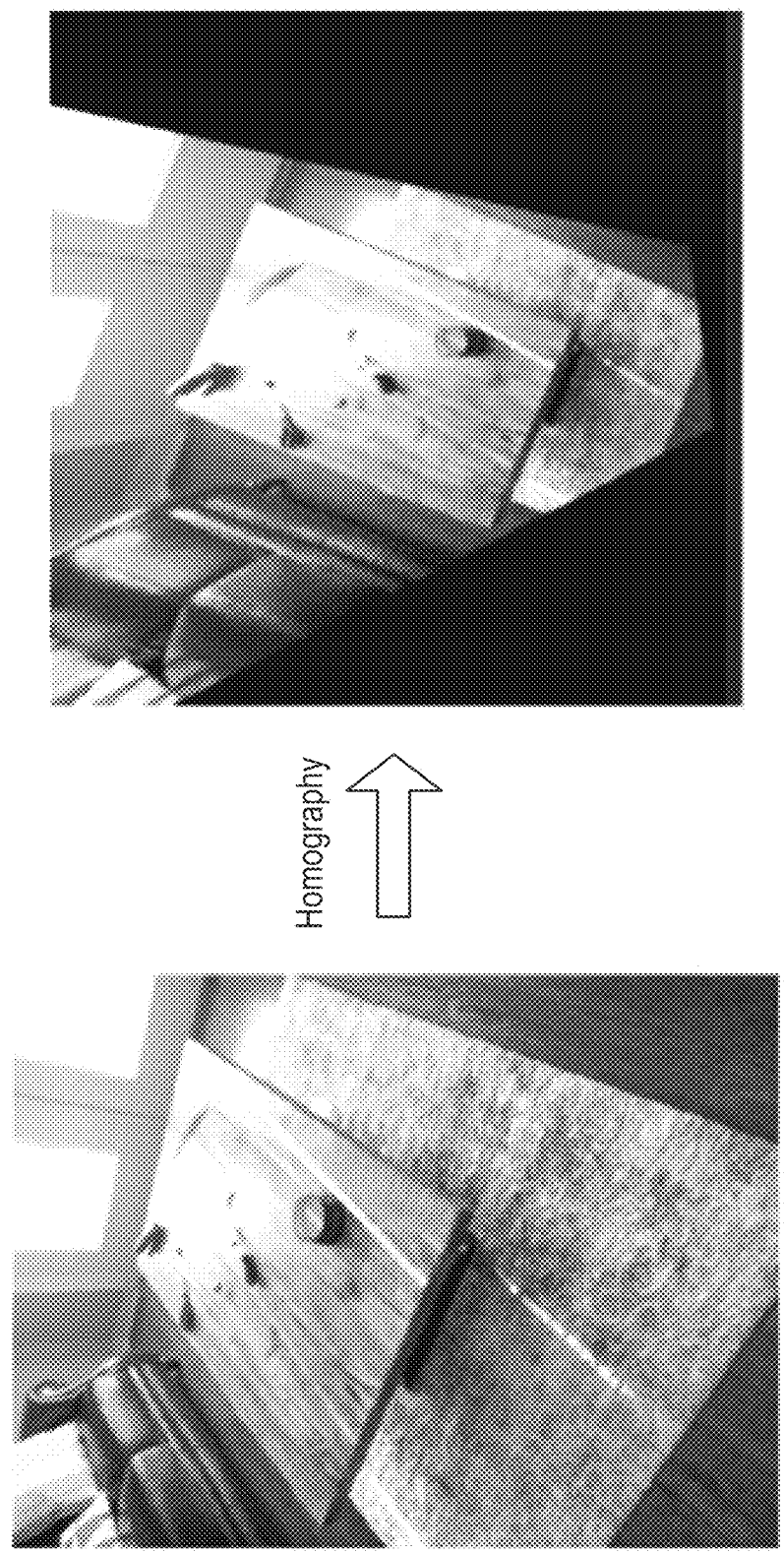
FIG. 6 illustrates how a homography can be used to directly map pixels included in an image generated from a perspective view to a top-down view.

Assume, for example, that the inspection platform obtains an image of a table for which the height relative to the image sensor is known. In this situation, the inspection platform can compute a homography for the table and then directly generate an overhead DEM by projecting pixels corresponding to the table in accordance with the homography. FIG. 6 illustrates how a homography can be used to directly map pixels included in an image generated from a perspective view to a top-down view.

FIG. 7 illustrates how a homography may only be correct for flat surfaces at a single height. In FIG. 7, the top-down view is pixel perfect for the table as shown by its rectangular border, while other objects (e.g., the couch as indicated by Element A, the stapler as indicated by Element B, and the rug as indicated by Element C) are distorted. Again, this is because the surface of the table is substantially planar in the real world, so there is a homography that can easily and exactly map pixels associated with the table from the source image to the top-down view. As mentioned above, this homography may be simplified so as to only be a function of the height of the table relative to the image sensor, assuming that the table is substantially planar.

Accordingly, the inspection platform may be able to construct a partial DEM, while completely bypassing the need to create a very dense point cloud or infer a smooth surface over a point cloud. Using a homography and the relative height of a given flat object, the inspection platform can instead map pixels directly from the source image to the overhead DEM. This approach not only simplifies the overall technique for generating top-down views, but also offers significant savings of computational resources.

Note, however, that this particular homography determined for the table will only be good for mapping other flat objects that are at exactly the same elevation as the table. For all other objects at different heights, the homography will produce distorted results. Referring again to FIG. 7, for example, the sides of the couch (Element A) should not be visible in a top-down view; the top edge of the stapler (Element B) goes beyond the table, where the stapler should actually be entirely contained within the periphery of the table in a top-down view; and the rug (Element C) appears smaller than the table despite actually being larger than the table.

Figure 8:
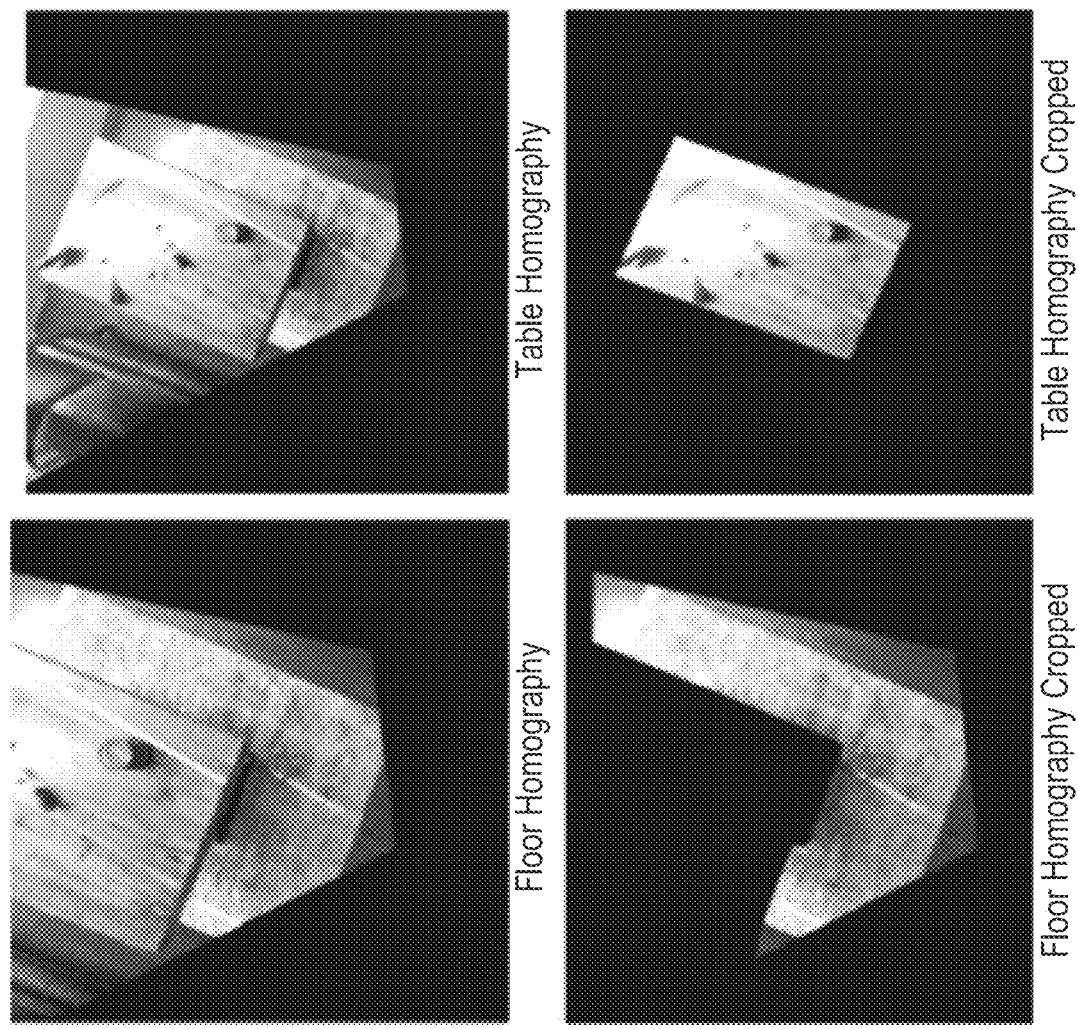
FIG. 8 illustrates how pixels corresponding to different flat objects can be independently mapped to the top-down view using different homographies.

In the image shown in FIGS. 6-7, a significant portion of its content is devoted to the table, which is substantially flat along one plane at a first height, and a significant portion of its content is devoted to the floor, which is substantially flat along another plane at a second height. The inspection platform can independently map each of these objects (i.e., the table and floor) to the overhead DEM using two different homographies, namely, a first homography constructed based on the first height and a second homography constructed based on the second height. FIG. 8 illustrates how pixels corresponding to different flat objects can be independently mapped to the top-down view using different homographies. As shown in FIG. 8, because the inspection platform knows which pixels are associated with the table and floor, the inspection platform could also crop the resulting post-homography projections to only include the appropriate pixels. Thus, the pixels mapped to the top-down view in accordance with the first homography may be solely representative of the table, and pixels mapped to the top-down view in accordance with the second homography may be solely representative of the floor.

As a result, the inspection platform may have two cropped regions of pixels. A first cropped region of pixels may correspond to the properly mapped table, while a second cropped region of pixels may correspond to the properly mapped floor. Because of the nature of homographic construction, the first and second cropped regions of pixels can be projected by the inspection platform onto the same overhead DEM. The inspection platform may be able to create a correctly scaled composite of the table and floor simply by stacking the first and second cropped regions of pixels in order of increasing height (e.g., floor and then table).

Figure 9:
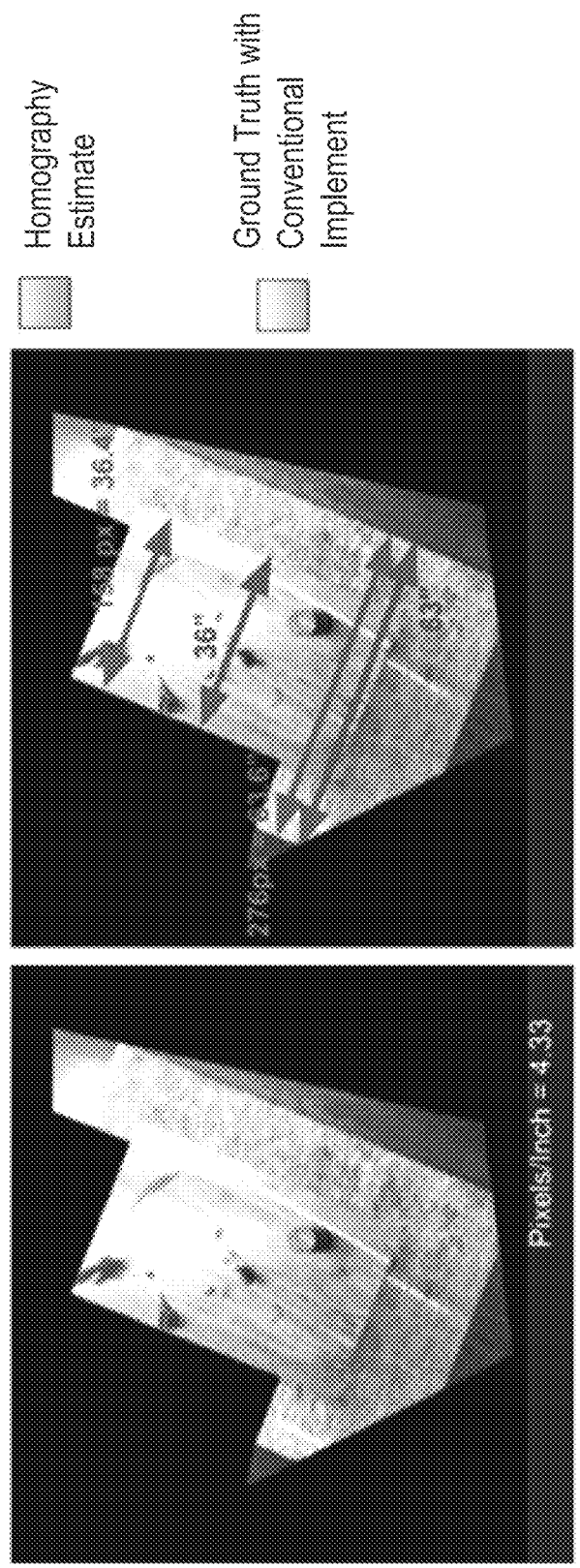
FIG. 9 includes an example of a multi-homography view in which estimates of dimensions, as determined from the pixels per meter (PPM) ratio, are compared to ground truth as measured by a tape measure.

As part of the computation of the various homographies, the inspection platform may also compute, derive, or otherwise establish a pixel per meters (PPM) ratio for the overhead DEM. This may be helpful as the inspection platform can use the PPM ratio to measure real-word distances through analysis of the overhead DEM. FIG. 9 includes an example of a multi-homography view in which estimates of dimensions, as determined from the PPM ratio, are compared to ground truth as measured by a tape measure. In this example, the inspection platform has determined that 4.33 pixels are representative of an inch (and therefore, the PPM ratio is roughly 170.6). Using this metric, the inspection platform can estimate dimensions of objects included in the overhead DEM. Here, for example, the inspection platform predicts that the table is 36.4 inches wide (error=0.4 inches), and the rug is 63.6 inches wide (error=0.6 inches). These results compare well against the ground truth.

Methodology for Generating Top-Down Views of Scenes

Using the approach discussed above, the inspection platform can project a portion of an image of a flat object (e.g., a table) with a known height using one homography, and the inspection platform can project different portions of an image of two flat objects (e.g., a table and floor) with known heights using two homographies. Generally, an image of an interior space will include many objects with different heights. In order to map the image onto an overhead DEM, the inspection platform can extrapolate this approach to however many flat objects happen to be present in an image. In fact, the inspection platform may be able to simply approximate an entire interior space captured in the image by treating the interior space as a composition of a large number (e.g., hundreds or thousands) of small planar surfaces that are roughly parallel to the ground.

Figure 10:
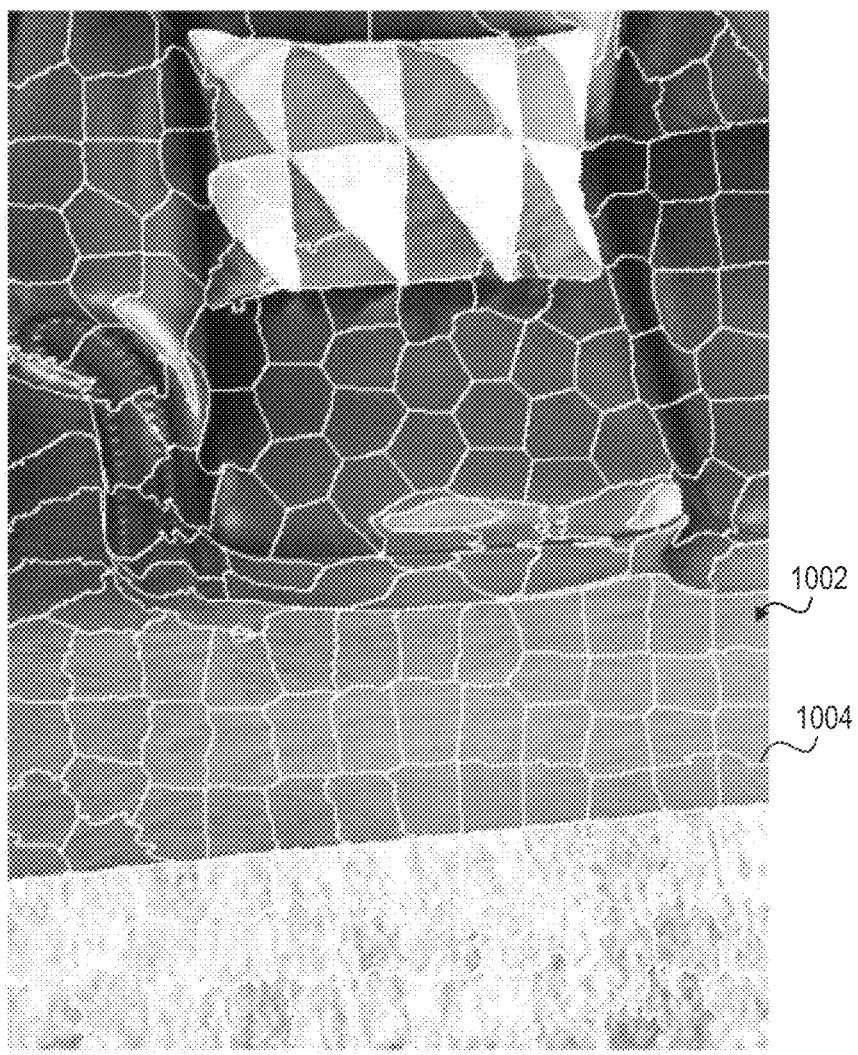
FIG. 10 includes an example of an image of an interior space that has been divided into facet regions (also referred to as "facets").

FIG. 10 includes an example of an image 1000 of an interior space that has been divided into facet regions 1002 (also referred to as "facets"). Each facet may be relatively small, ranging from several dozen to several hundred pixels, and therefore may also be referred to as a "microfacet." As further discussed below, the inspection platform can define the bounds of each facet based on the heights determined for pixels included in the image. Each facet may include pixels that are determined to correspond to a comparable height relative to the camera.

Figure 11:
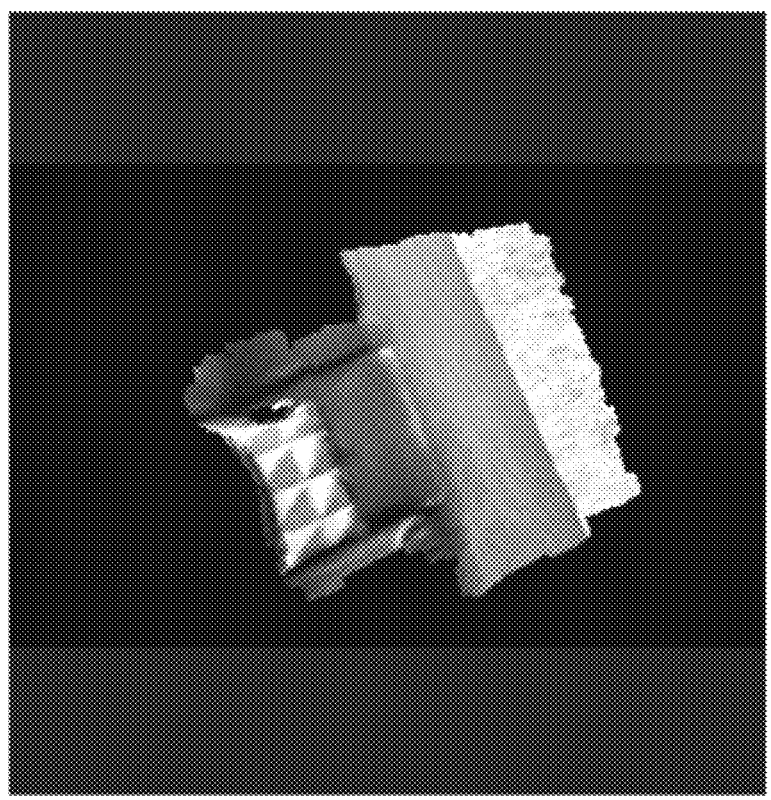
FIG. 11 illustrates how the pixels corresponding to different facets at different elevations can be stacked on one another in an overhead depth elevation model (DEM), so as to generate a top-down view of the interior space.

For an image of an interior space, the inspection platform may initially select, define, or determine facets 1002 and then establish the boundaries 1004 of those facets. Generally, the boundaries will be representative of visual discontinuities and/or height discontinuities that are discovered by the inspection platform through analysis of the image. The inspection platform can then determine the corresponding real-world height of each facet. These real-world heights may be determined based on (i) a point cloud produced by an AR framework for the image and/or (ii) a point cloud determined by the inspection platform using stereo techniques. Thereafter, the inspection platform can project each facet onto an overhead DEM using an appropriate homography. To accomplish this, the inspection platform can obtain pixels corresponding to each facet (e.g., by cropped all other pixels) and then mapping the pixels onto the overhead DEM at a single elevation. The various facets projected onto the overhead DEM may be stacked in order to view the top-down view of the interior space. FIG. 11 illustrates how the pixels corresponding to different facets at different elevations can be stacked on one another in an overhead DEM, so as to generate a top-down view of the interior space. Note that this top-down view resembles the point cloud shown in FIG. 5, except the inspection platform has produced a continuous view rather than one based entirely on points.

Below, a five-step process is described for generating a top-down view of an interior space that is representative of an overhead DEM. While aspects of the process are discussed in detail, those skilled in the art will recognize that the process is amenable to various modifications. As such, other embodiments of the process could include more of less than the five steps discussed below.

A. Collect a First Point Cloud Using AR Framework

To begin the process, the inspection platform may instruct a user to pan a computing device across a scene (e.g., of an interior space), so as to generate a series of images of the scene using an image sensor contained therein. However, before the user pans the computing device across the scene, the inspection platform may invoke an AR framework executing on the computing device. Whenever an image of the scene is generated, the image can be provided to the AR framework as input. As output, the AR framework may produce—as a byproduct of its operation—(i) a point cloud and (ii) a spatial coordinate that indicates the position and orientation of the image sensor when the image was generated. As mentioned above, this point cloud will normally be relatively sparse (e.g., with dozens or hundreds of points). Moreover, the points of this point cloud will normally be concentrated around regions with high amounts of texture. Accordingly, regions with low texture will often not contain any points in this point cloud, even though these regions may be important in terms of understanding content and context of the image.

Figure 12:
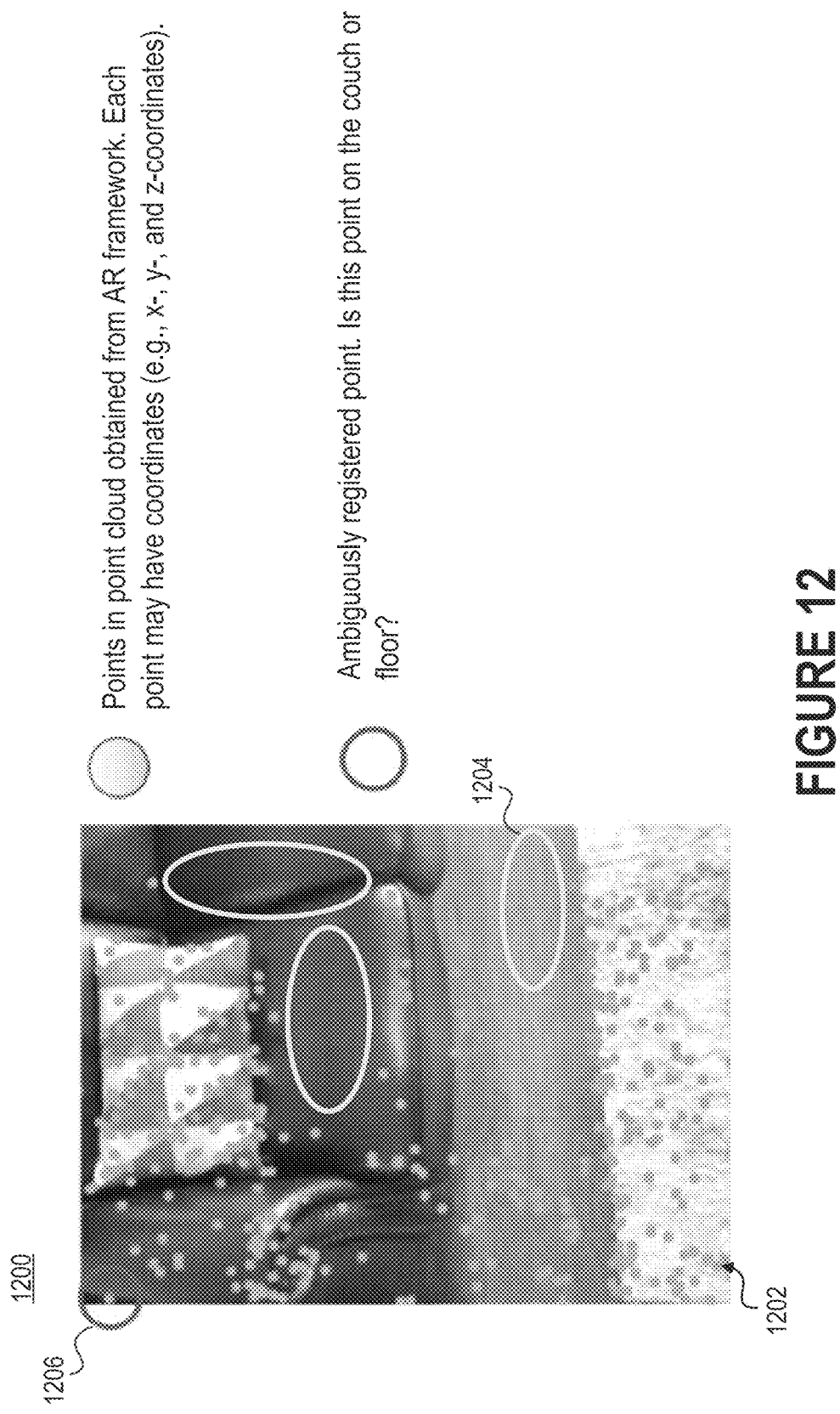
FIG. 12 illustrates how the points included in a point cloud that is generated by an augmented reality (AR) framework may be strewn about the image, leaving some areas poorly registered.

Each point included in a point cloud that is produced by the AR framework is representative of a separate depth estimate. While point clouds produced by the AR framework are generally very accurate, these point clouds are not always well registered to real-world surfaces. FIG. 12 illustrates how the points 1202 included in a point cloud that is generated by an AR framework may be strewn about the image 1200, leaving some areas 1204—like the couch cushions and floor—poorly registered. This tends to be especially true on corners and edges. Often, the AR framework will track a point at a particular depth, but this point may be right on the border of a significant depth variation (e.g. corner or edge). Referring to FIG. 12, for example, there is an ambiguous point 1206 that is located on the border of the armrest and floor. It is not immediately clear which surface this point is registered to, and as such, it is difficult to directly use the point cloud produced by the AR framework to perform per-pixel depth estimation with high accuracy.

B. Divide Each Image into Facets

Since the inspection platform will use one homography per facet as further discussed below, its goal is to define the facets to include regions of pixels that are approximately the same real-world height. Importantly, the inspection platform should ensure that each facet does not include large discontinuities of real-world height since a single homography is only capable of properly projecting a single height. As such, boundaries of the facets defined by the inspection platform should lie on visual discontinuities and/or height discontinuities.

Figure 13:
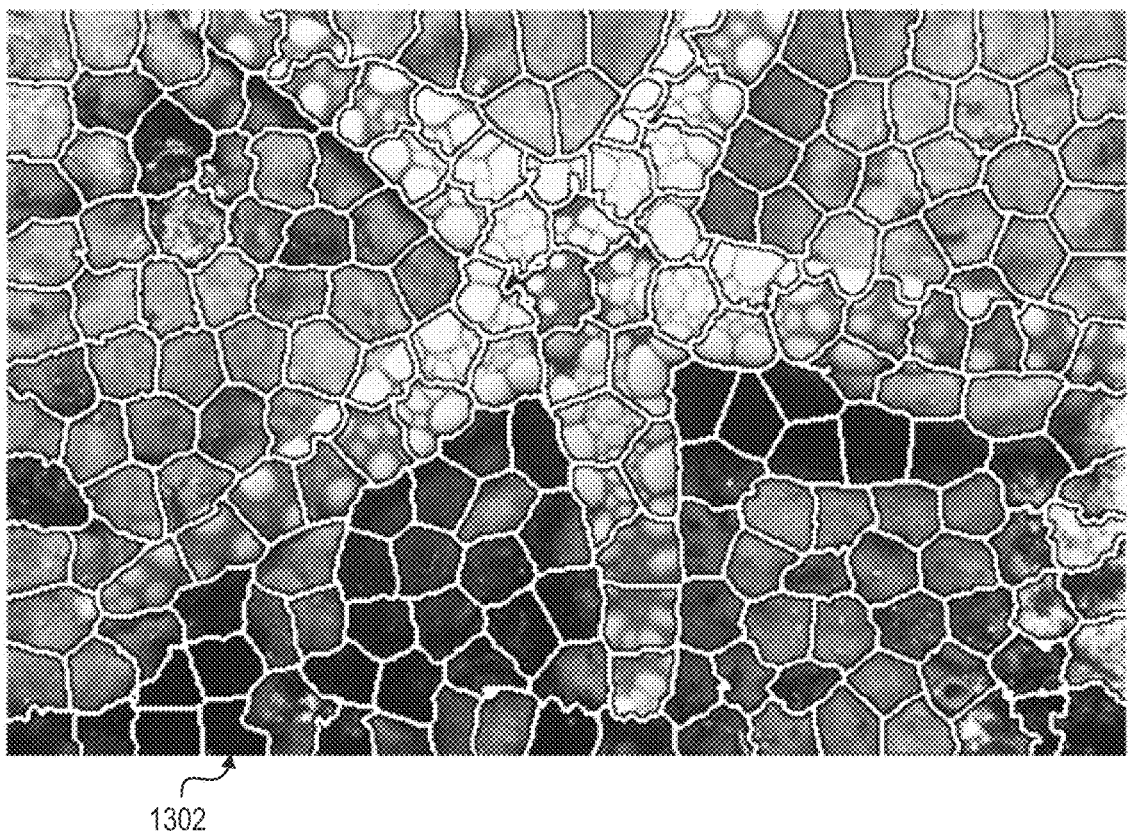
FIG. 13 illustrates how superpixel techniques have traditionally been used to segment images such that internal variation is minimized.

Superpixel techniques represent an attractive option for defining the facets. The term "superpixel" may refer to a group of pixels that share common characteristics, like pixel intensity and color values, while the term "superpixel techniques" may refer to a family of computer vision algorithms that are designed, developed, and trained to divide an image into groups of pixels that are as self-similar as possible. FIG. 13 illustrates how superpixel techniques have traditionally been used to segment images such that internal variation is minimized. As can be seen in FIG. 13, applying a superpixel technique will result in the image 1300 being segmented into different facets 1302 that are visually self-similar to one another.

Figure 14:
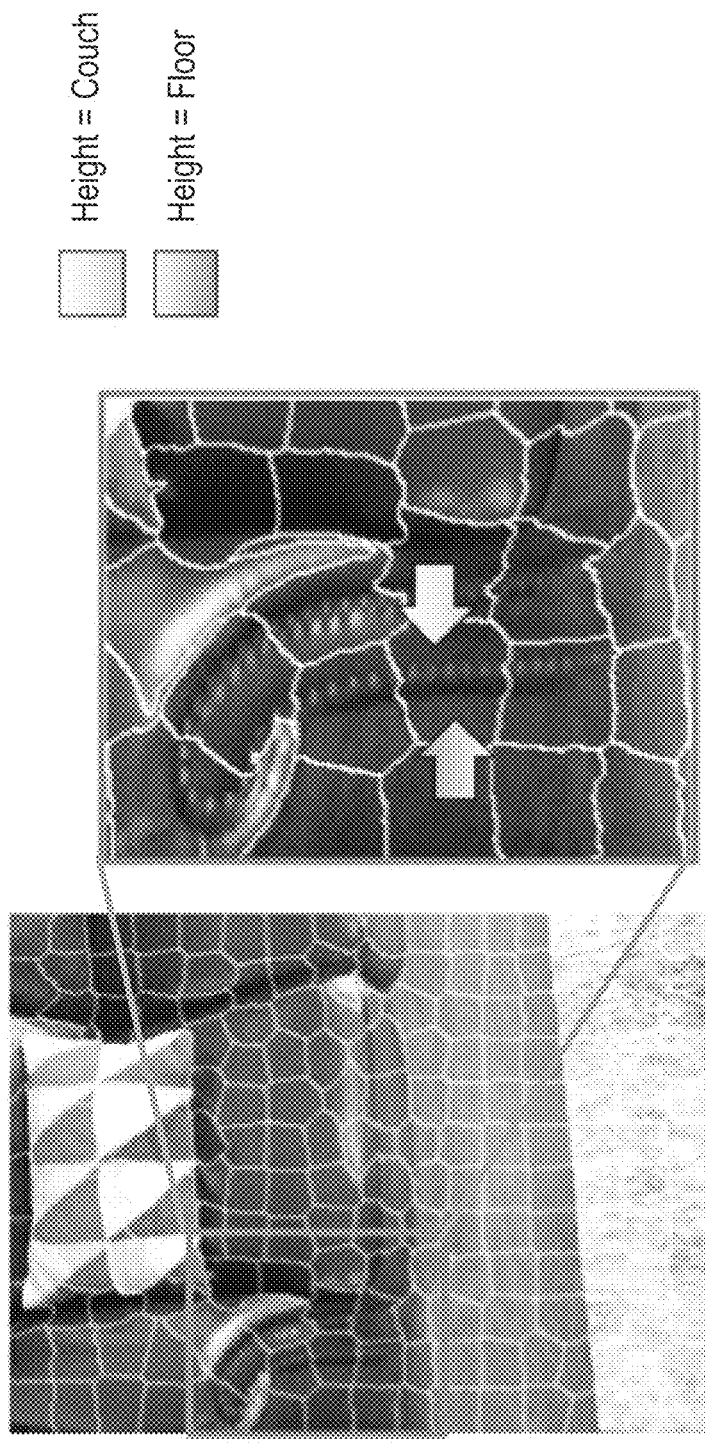
FIG. 14 illustrates how superpixel techniques may be imprecise if boundaries are defined so as to minimize variation in each facet.

Naively applying superpixel techniques to generate facets tends not to work well though. A core reason is that regions that are visually self-similar can have very different real-world heights. FIG. 14 illustrates how superpixel techniques may be imprecise if boundaries are defined so as to minimize variation in each facet. In FIG. 14, there is a single facet whose right half includes pixels corresponding to the couch and whose left half includes pixels corresponding to the floor. Since there is a large discontinuity in height inside this facet, no single homography will be able to correctly project its pixels onto an overhead DEM.

To address this issue, the inspection platform can compute a dense depth estimate of the scene. This can be accomplished using (i) depth optical flow methods on adjacent images generated by the image sensor along with spatial coordinates of the image sensor as estimated by the AR framework or (ii) a computer-implemented model (or simply "model") that is trained to estimate depth from single images. The model could be, for example, a deep neural network. Regardless of the approach, the result may be a very dense (e.g., hundreds or thousands of points) but relatively rough estimate of the depth of the scene for each image. FIG. 15 illustrates how depth may be estimated by the inspection platform for an image 1500 of a scene.

In order to compute the dense depth estimate of the scene, the inspection platform may implement a proprietary software package or a publicly available software package. Generally, the depth estimates are not guaranteed to be correct in a photogrammetric sense. However, most algorithms that are designed and then trained to produce depth estimates are good at estimating height discontinuities (also referred to as "depth discontinuities"). In FIG. 15, the depth estimates have been populated into a matrix having the same dimensions as the image 1500, and a depth image 1502 (also referred to as a "depth map") has been generated based on the matrix. Rather than absolute values, discontinuities in height—which can be determined from the depth map 1502—are what the inspection platform is normally interested in. The depth map 1502 may indicate, on a per-pixel basis, an estimated distance from the image sensor used to generate the image 1500 as determined from an analysis of its pixels.

The inspection platform may augment the image 1500 of the scene with the depth estimates and then perform segmentation based on the augmented image. Assume, for example, that the image 1500 is a red-green-blue (RGB) image, such that each pixel is associated with three values, namely, a red value, green value, and blue value. One approach to augmentation is to channel-wise append the one-channel depth map to the three-channel RGB image and then perform segmentation over the resulting four-channel augmented image. Another approach to augmentation is to perform linear or non-linear blending of the one-channel depth map and three-channel RGB channel, so as to create a hybrid three-channel RGB and depth image (also referred to as a "RGB/D image") in a synthetic color space. One approach may involve using dimensionality reduction techniques like Principal Component Analysis (PCA) to solve for optimal blending. Given a series of four-dimensional (4D) vectors (e.g., with values for red, green, blue, and depth), PCA can be used to find a 3×4 transformation matrix that, when multiplied by a 4D vector, will produce a 3D vector as output, such that minimal information loss occurs during the blending. This approach effectively blends the four input channels into three hybrid output channels. Another approach is to apply a blending factor (F) to each RGBD pixel value as follows:

$$R = R \times (1-F) + F \times B \qquad \text{Eq. 1}$$

$$G = G \times (1-F) + F \times B \qquad \text{Eq. 2}$$

$$B = D \qquad \text{Eq. 3}$$

Figure 16:
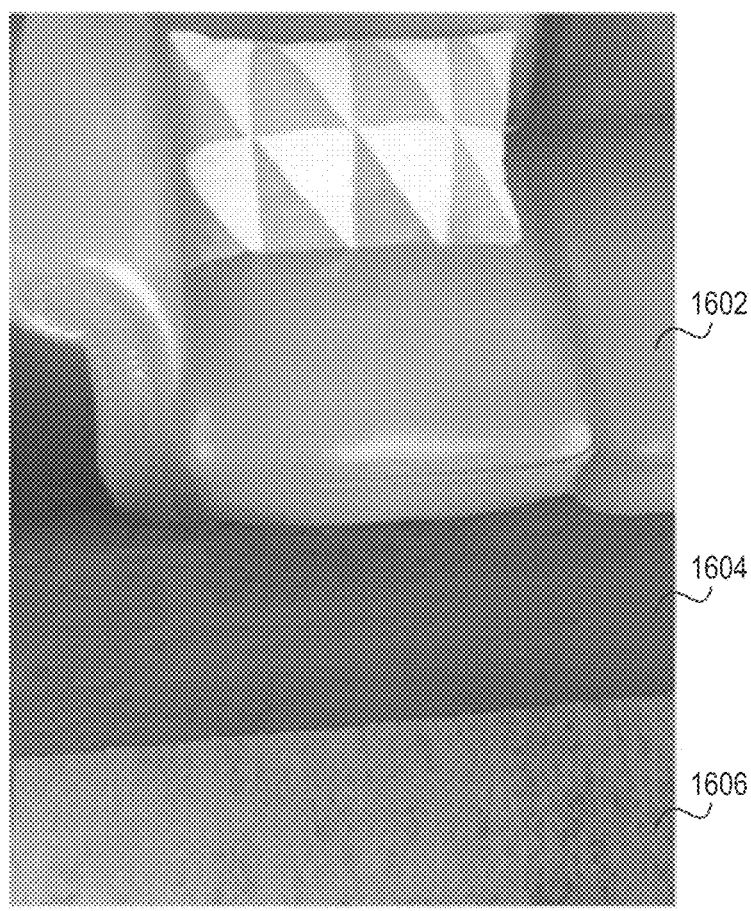
FIG. 16 includes an example of a depth-augmented image where the estimated heights represented in the single channel of the depth map have been blended into the green channel.

Together, Eqs. 1-3 allow the four input channels to blended into three hybrid output channels through the use of programmed heuristics. At a high level, Eqs. 1-3 sacrifice one channel—namely, blue—to entirely represent depth information while the sacrificed channel data is blended into the other channels. Those skilled in the art will recognize that Eqs. 1-3 are provided for the purpose of illustration. Any permutation of R, G, and B in Eqs. 1-3 would work similarly, This approach may be helpful if the inspection platform (or an administrator responsible for managing the inspection platform) is interested in reusing superpixel libraries that only support images with three channels. FIG. 16 includes an example of a depth-augmented image 1600 where the estimated heights represented in the single channel of the depth map have been blended into the green channel. Thus, the inspection platform may be able to indicate the heights of pixels included in the image by manipulating the values in one of the color channels of the image undergoing examination. In FIG. 16, for example, the height of the couch 1602 is indicated using a first color, the height of the floor 1604 is indicated using a second color, and the height of the rug 1606 is indicated using a third color. Similarity or "closeness" in terms of height can be visually conveyed using these colors. In FIG. 16, for example, the floor 1604 and rug 1606 are more comparable in terms of color to one another than the couch 1602 since those objects are roughly similar heights.

Figure 17:
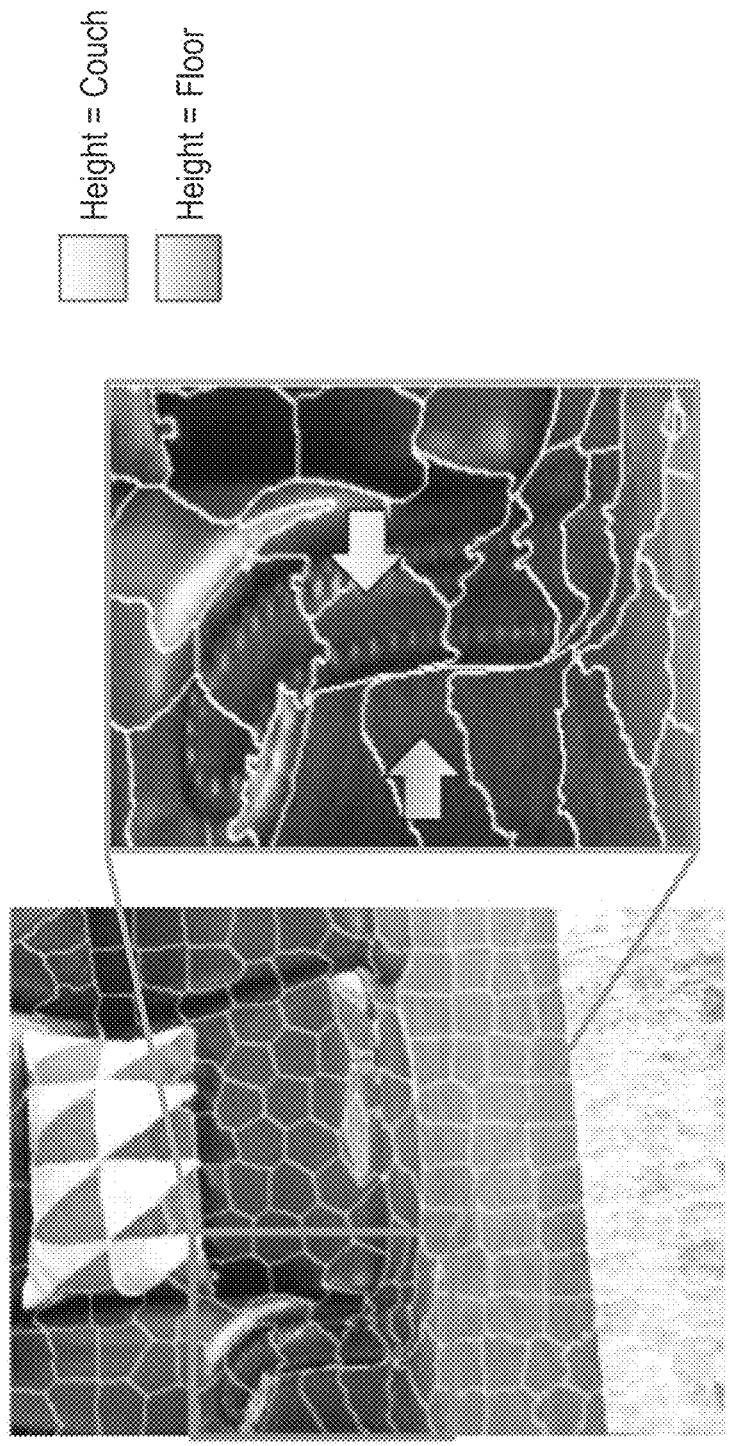
FIG. 17 illustrates how depth-augmented images tend to more consistently produce facets whose pixels correspond to a single height.

After the RGB image is augmented with depth information, the inspection platform may perform superpixel segmentation. Because information regarding the depth has been added, the boundaries of the resulting facets will normally be more aligned with visual and height discontinuities. FIG. 17 illustrates how depth-augmented images tend to more consistently produce facets whose pixels correspond to a single height. In comparison to FIG. 14, the facet along the edge of the couch now includes mostly or only pixels that actually correspond to the couch (and not the floor).

C. Estimate A Second Point Cloud

As mentioned above, the image sensor of the camera may generate a series of images as the user pans the computing device across the scene. By providing the series of images to the AR framework as input, the inspection platform may obtain a series of spatial coordinates, each of which may be representative of an estimate of the position and orientation of the image sensor when the corresponding image was generated. Using these spatial coordinates, the inspection platform can use depth-from-stereo approaches to estimate the spatial position of an array of points across the scene. For example, the inspection platform may employ a depth-from-disparity approach or depth-from-triangulation approach to determine a spatial coordinate for each point included in the array.

For these depth-from-stereo approaches, the inspection platform analyzes one image (also referred to as a "first image") in the context of another image (also referred to as a "second image"). Thus, the inspection platform may calculate disparity by monitoring movement of points across the first and second images. Generally, the first and second images are generated by the image sensor immediately adjacent one another. Said another way, the inspection platform may use images adjacent one another in the capture sequence of the image sensor as the "image pairs" for generating point clouds via stereo techniques. However, that need not necessarily be the case. For example, to get a wider baseline, the inspection platform may use images that capture roughly the same portion of the scene but are separated (e.g., in terms of time and perspective). Thus, the inspection platform could examine non-adjacent pairs of images to calculate disparity.

At a high level, the inspection platform can select an array of points on the first image that is generated by the image sensor. This array will normally be relatively dense. For example, a point may be assigned to every other pixel, or a point may be assigned to every pixel in the first area if computational resources allow. Thereafter, the inspection platform can track these points in screen-space to the second image and then use triangulation based on the spatial coordinates corresponding to the first and second images to determine the real-world position of each tracked point.

FIG. 18 illustrates how the inspection platform can generate a dense point cloud 1802 for an image 1800 using stereo techniques. This point cloud 1802 may be relatively dense in comparison to the point cloud generated by the AR framework for the same image. In FIG. 18, for example, the points 1804 are tightly arranged in grid form so as to cover a significant portion of the image 1800. However, depending on how reliably the inspection platform is able to match points across pairs of images (also referred to as "disparity pairs"), the depth estimate of each point may be imprecise or inaccurate.

D. Estimate Height for Facets

At this stage, the inspection platform may have (i) an image that is divided into facets, (ii) a first point cloud that is produced by the AR framework, and (iii) a second point cloud that is generated based on stereo techniques. The first point cloud may be more accurate but sparser than the second cloud as mentioned above.

Figure 19:
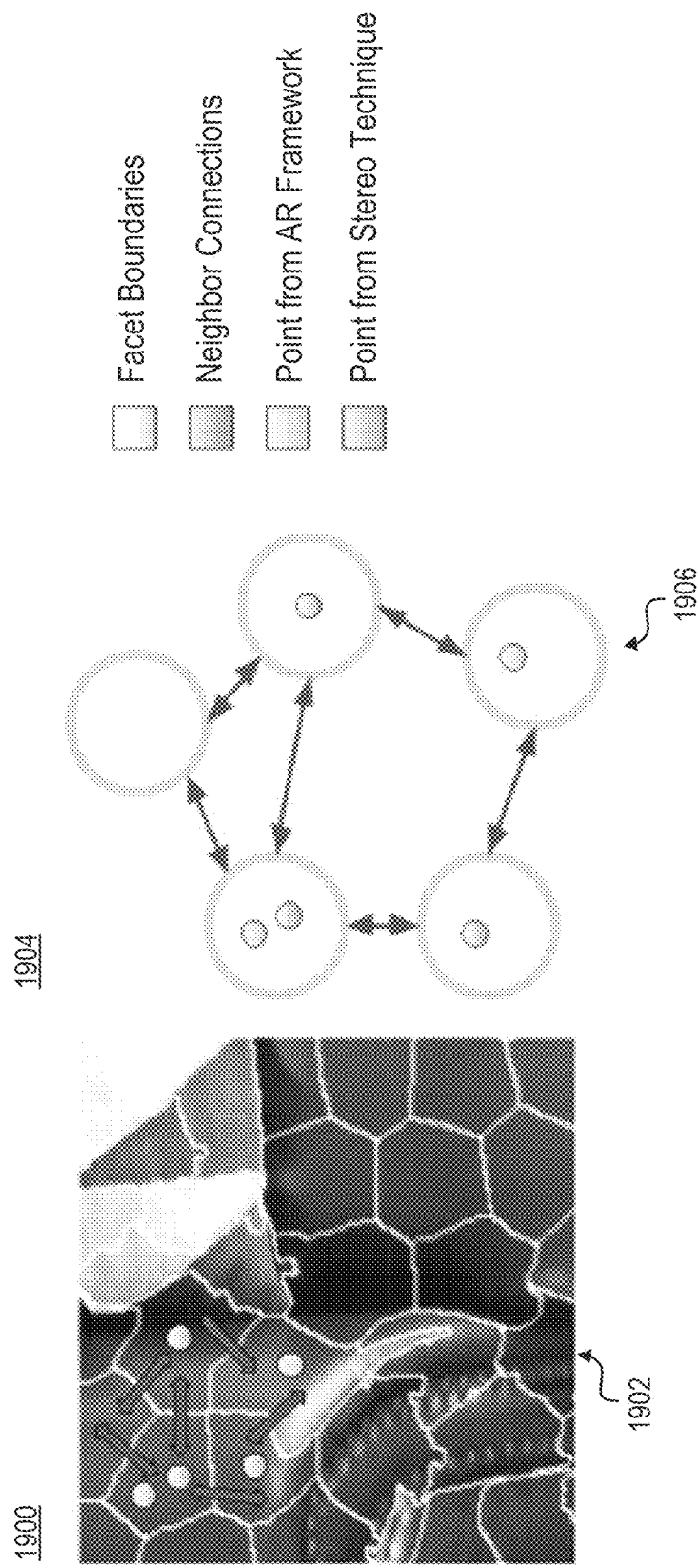
FIG. 19 illustrates how the facets defined for an image can be represented by the inspection platform in graph form for height estimation purposes.

Each facet may be treated by the inspection platform as a separate node in a graph, where each node is connected to the neighboring facet via shared borders. FIG. 19 illustrates how the facets 1902 defined for an image 1900 can be represented by the inspection platform in graph form 1904 for height estimation purposes. Some "facet nodes" 1906 will contain accurate depth estimates that are determined by the AR framework, while other facet nodes will contain less accurate depth estimates that are determined through stereo techniques. Some facet nodes may contain both types of depth estimate, while still others may not contain either type of depth estimate.

At a high level, the goal of the inspection platform may be to assign robust depth estimates to as many of the facets as possible. To begin, the inspection platform may identify "seed nodes" that contain both types of depth estimate, and where those depth estimates agree within a given threshold. Since the depth estimates agree for those seed nodes, the estimated heights are likely correct for those facets (and thus, the inspection platform may assign the estimated heights to those facets as the actual heights). Referring to FIG. 19, for example, one node includes points from the first and second clouds. So long as these points agree on the estimated height, the estimated height can be assigned to the corresponding facet by the inspection platform.

Note that the error tolerance governing the degree to which those depth estimates must agree to be considered "matching" may be a free parameter. If the inspection platform requires that those depth estimates match perfectly, then effectively no facets would ever been considered matches (and the resulting top-down image would include many blank areas). As the error tolerance increases, more facets will be considered matches (and thus, more facets will be mapped to the DEM, resulting in a top-down image with fewer blank areas). However, if the error tolerance gets too large, dissimilar projected heights could be considered matches, leading to visual artifacts in the top-down image.

Accordingly, the inspection platform may determine (e.g., through automated analysis of top-down images created as part of a training exercise) a threshold height (T). When a given node contains estimates produced by the AR framework and through the stereo technique, the inspection platform may classify the given node as a seed node if:

$$|\text{AR Height Estimate} - \text{Stereo Height Estimate}| < T. \quad \text{Eq. 4}$$

Note that the threshold height (T) could also be programmed into the inspection platform (e.g., by a user). It has been empirically found that using roughly 0.5 inches as the threshold height works well for producing top-down images that are largely complete without notable visual artifacts. AR frameworks tend to be able to readily produce height estimates with less than 0.5 inches error, and there is normally enough agreement between the first and second point clouds under that threshold to produce top-down images are that sufficient complete for analysis purposes.

If a region is such that absolutely no agreement is found, then that facet may simply be discarded for that image. If the image is part of a series of images that are captured in sequence, then the next image in the capture sequence may allow agreement to be found in the region. In the unlikely event that no agreement is ever found across all of the images in the series that contain the region, the inspection platform can leave that region blank on the top-down image. It has been found that this scenario—namely, where no agreement is ever reached for a given region—tends to only occur when there are no visual features to track. For example, this may occur if the user scans over a deep waste bin that appears dark inside. Since there is very little for the image sensor to see, the depth estimates may be dissimilar from one another. These regions rarely contain physical structures of interest, however, so there is generally little harm in not showing these regions on the top-down image.

Next, for all facets that contain either (i) a point from the first point cloud or (ii) a point from the second point cloud, the inspection platform can compute a height for the corresponding facets. The inspection platform can do this by averaging all of the points that fall into the corresponding facets. Alternatively, the inspection platform may examine the estimated heights of nearby points (e.g., in adjacent facets) and then compute the height accordingly (e.g., by averaging the estimated heights of adjacent facets in a weighted manner based on similarity or proximity to the facet).

Figure 20A:
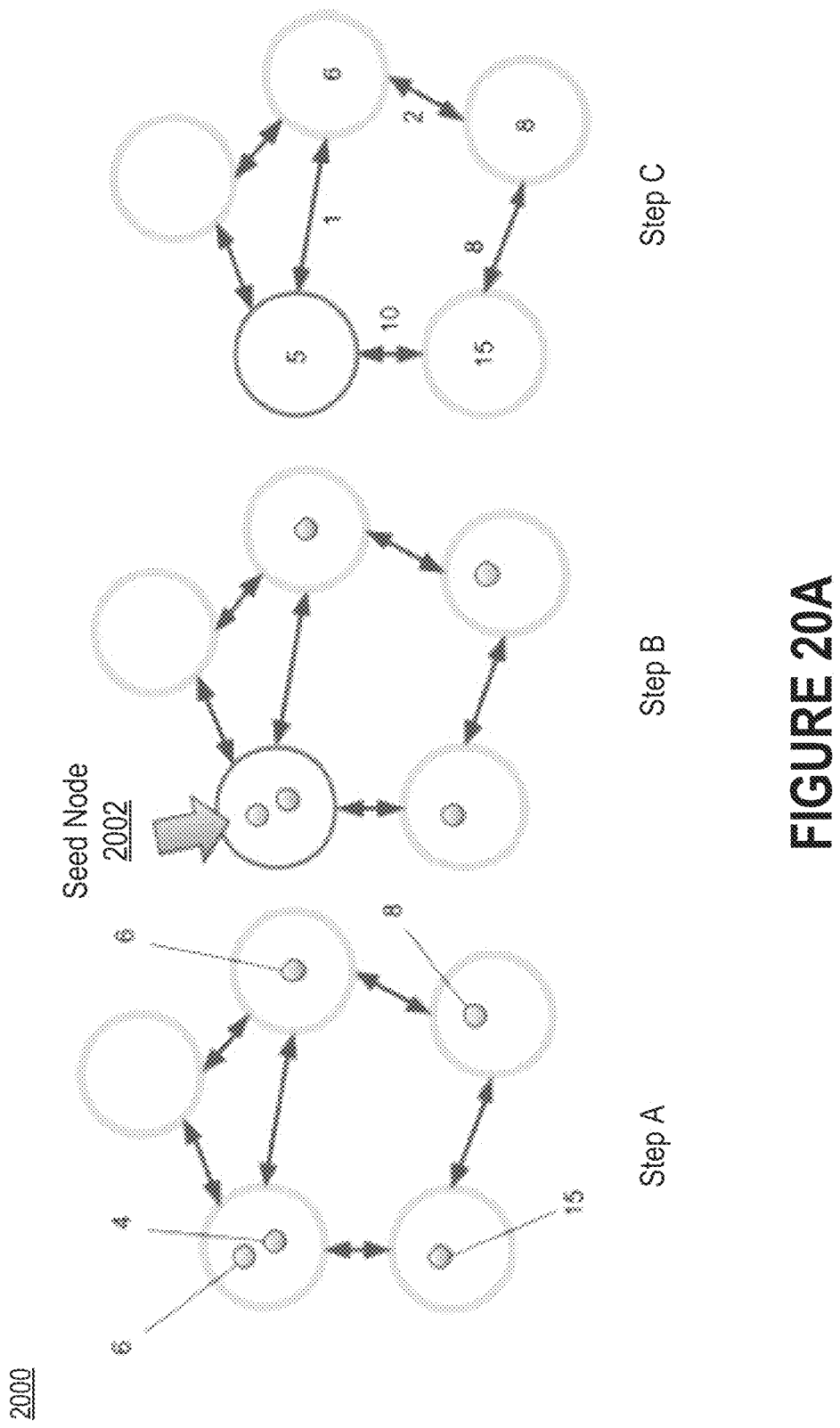
FIG. 20A includes several diagrams that illustrate how different facets represented in graph form can be identified as seed nodes based on an analysis of the depth estimates contained therein.
Figure 20B:
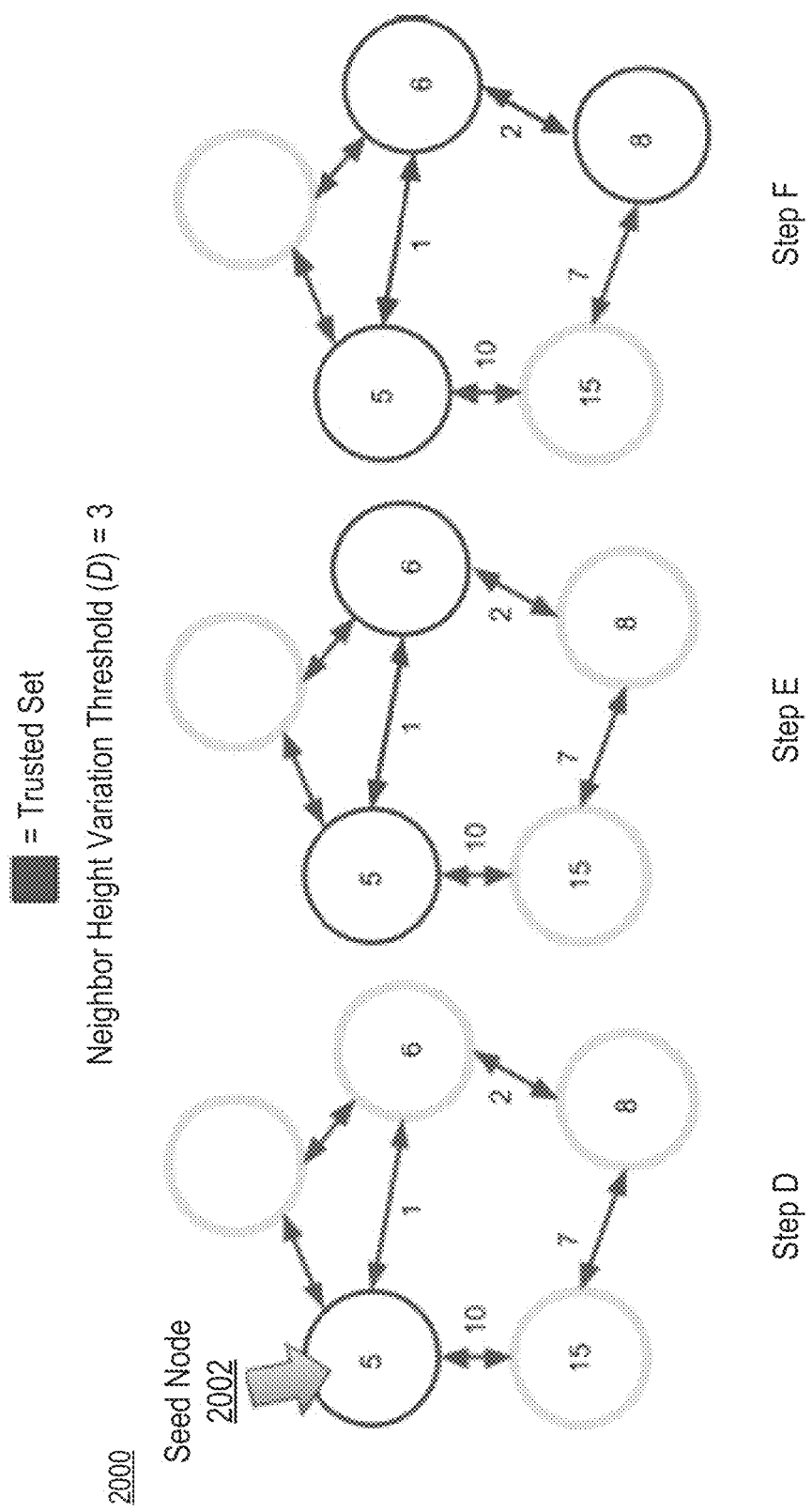
FIG. 20B includes several diagrams that illustrate how the inspection platform can progressively establish heights for different facets represented in graph form based on number and type of depth estimate.

Together, FIGS. 20A-B illustrate how the inspection platform can iteratively compute a trusted set of nodes that have been assigned the correct height via the averaging mechanism described herein. FIG. 20A includes several diagrams that illustrate how different facets represented in graph form 2000 can be identified as seed nodes based on an analysis of the depth estimates contained therein. More specifically, Step A illustrates how heights can be readily established for each node. Step B illustrates how those nodes that have consistent depth estimates in the first and second point clouds can be identified as seed nodes 2002. Step C illustrates how an average height estimate can be computed for each node and then a height difference estimate can be computed for each pair of neighboring nodes.

FIG. 20B includes several diagrams that illustrate how the inspection platform can progressively establish heights for different facets represented in graph form 2000 based on number and type of depth estimate. Step D illustrates how the trusted set may initially only include seed nodes. Step E illustrates how the inspection platform can iteratively expand the trusted set with nodes that can be connected to trusted nodes with a height variation less than a chosen threshold. In this example, the height variation threshold equals three. Step F illustrates how this process can continue until no more nodes can be added to the trusted set. Note that the node with a height estimate of 15 is never added to the trusted set since its edge connections are all greater than the height variation threshold.

Accordingly, the inspection platform can initially select the facets with depth estimates that it believes are sufficiently reliable. As mentioned above, depth estimates for the points in the second point cloud are generally more numerous but less accurate than depth estimates for the points in the first point cloud. Also, the inspection platform may be wary of considering facets with depth estimate(s) based solely on point(s) in the second point cloud since those depth estimate(s) have a higher likelihood of being wrong by a significant amount.

The trusted set may initially only include the seed nodes that have height estimates of different types that agree with one another. For many real-world scenes, while most of the surfaces of interest are not perfectly flat, these surfaces are relatively smooth. The inspection platform can treat depth estimates in a similar matter. Thus, the inspection platform may implement or choose a maximum amount by which these surfaces are expected to vary between neighboring nodes. This maximum height variation threshold (D) may be determined by the inspection platform or programmed into the inspection platform.

Accordingly, the inspection platform may include a given facet in the trusted set if the given facet is either (i) a seed node or (ii) can be connected to a trusted node with a height variation less than a chosen threshold. At a high level, the concept is derived from the idea that the trusted set should include those trusted nodes whose heights are roughly similar to one another. Imagine, for example, a node ($N_t$) with height estimate $H_t$ is included in the trusted set. Imagine also that there is a connected neighbor node ($N_q$) with height estimate $H_q$. In this situation, the connected neighbor node can be added to the trust set if:

$$|H_q - H_t| < D. \quad \text{Eq. 5}$$

The inspection platform can continue to iteratively expand the trust set until no more nodes can be added. As mentioned above, setting the maximum height variation threshold (D) to 0.5 inches has been shown to work well empirically.

Accordingly, the trust set can be computed, defined, or otherwise determined in several different ways. First, as a heuristic, the inspection platform can simply start with the seed node and then add to the trusted set based on an analysis of all adjacent neighboring nodes. A neighboring node may be added to the trusted set so long as its height does not vary from the height of the seed node by more than a predetermined amount (e.g., 1, 3, or 5 centimeters). Second, the inspection platform can use graph optimization methods in addition to a min-cut solution to segment out the neighboring nodes of seed nodes that are connected by relatively low variation edges. Third, the inspection platform could develop, train, and then implement a graph-based model to perform segmentation based on an analysis of the depth estimates produced for the various facets.

E. Projecting Facets

At this stage, the inspection platform has determined its set of "trusted facets" for which depth estimates have been determined to be reliable. The inspection platform can compute an appropriate homography for each facet, and then the inspection platform can project each facet onto an overhead DEM, so as to produce an overhead view of the scene. Generally, the inspection platform will crop the result so that only the pixels within each facet will be projected in accordance with the corresponding homography. After doing this for all trusted facets, the inspection platform can sort the projects from lowest to highest in terms of real-world height and then arrange the projections. Accordingly, the inspection platform may project pixels onto the overhead DEM to emulate how higher surfaces overlaid on lower surfaces. This approach will result in the creation of a top-down view that is comparable to FIGS. 1 and 11.

Additionally or alternatively, the inspection platform may project a single value into the same facet instead of projecting red values, green values, and blue values. If the inspection platform projects the real-world height used to construct, develop, or otherwise determine the homographies for the trusted facets and then stacks the resulting single-value facets, the inspection platform may be able to approximate a depth map of the scene. FIG. 21 illustrates how the pixels of the trusted facets can be projected onto an overhead DEM to generate a top-down view of a scene, as well as how a single scalar value can be projected instead of the pixels to generate a depth map of the scene.

Exemplary Methodologies

FIG. 22 includes a flow diagram of a process 2200 for generating a top-down view of an interior space by projecting pixels onto an overhead DEM. For the purpose of illustration, the process 2200 is described in the context of a pair of images, namely, a first image and a second image that is generated after the first image. However, the process 2200 can (and often will) be performed multiples times in rapid succession as images are generated of an interior space. For example, as a user pans her computing device across the interior space, a series of images may be generated. These images can be handled in accordance with the process 2200 in a pairwise manner as discussed below.

Initially, an inspection platform executing on a computing device will receive input that is indicative of a request to generate a top-down view of an interior space (step 2201). The input normally corresponds to a user either initiating (i.e., opening) the inspection platform or interacting with the inspection platform in such a manner so as to indicate that she is interested in generating the top-down view. For example, the user may interact with a digital element labeled "Generate Top-Down View" or "Create Elevation Model" that is viewable on an interface generated by the inspection platform. Alternatively, this input could correspond to an instruction that is provided by either a server system to which the computing device is connected or the computing device itself. For example, the server system may transmit an instruction to initiate a guided modeling operation to the inspection platform responsive to a determination that certain conditions have been met, the user has indicated a willingness to complete the guided modeling operation, etc.

The inspection platform can then instruct the user to pan the computing device across the interior space, so as to generate a pair of images (step 2202). As mentioned above, this pair of images may include a first image and a second image that is generated after the first image. Thereafter, the inspection platform can obtain a first point cloud by providing the first image to an AR framework executing on the computing device (step 2203). Generally, this is accomplished in near real time by providing the first image to the AR framework upon generation by the computing device. Moreover, the inspection platform can obtain a second point cloud by providing the second image to the AR framework executing on the computing device (step 2204). Upon receiving the first image as input, the AR framework may produce, as output, (i) the first point cloud and (ii) a first spatial coordinate that is indicative of the position of the computing device (and, more specifically, its image sensor) when the first image was generated. Similarly, upon receiving the second image as input, the AR framework may produce, as output, (ii) the second point cloud and (ii) a second spatial coordinate that is indicative of the position of the computing device (and, more specifically, its image sensor) when the second image was generated.

The inspection platform can also generate another point cloud by monitoring movement of an array of points across the first and second images (step 2205). This third point cloud can be generated using stereo techniques as discussed above. For each point included in the array of points, the inspection platform may determine its spatial position by tracking movement across the first and second images and then computing its spatial position based on (i) the movement, (ii) the first spatial coordinate output by the AR framework for the first image, and (iii) the second spatial coordinate output by the AR framework for the second image. With these information, the inspection platform may be able to triangulate the location of each point in 3D space.

Then, the inspection platform can divide the first image into facets, so as to generate a faceted image (step 2206). Each facet may include pixels that are determined to correspond to a comparable height relative to the image sensor of the computing device. As mentioned above, this can be accomplished in several different ways. In some embodiments, the inspection platform applies, to the first image, a model (e.g., a neural network) that is trained to estimate depth in order to produce a depth map, identify height discontinuities based on an analysis of the depth map, and then perform segmentation based on the height discontinuities so as to define boundaries of the facets. In other embodiments, the inspection platform identifies height discontinuities based on analysis of the depth estimates produced for the points included in the third point cloud.

For each facet included in the faceted image, the inspection platform can estimate a height based on the first and third point clouds (step 2207). Generally, the inspection platform estimates the height in accordance with the approach described above with reference to FIGS. 19-20. Accordingly, the inspection platform may classify the facets by identifying (i) a first subset of facets that include (a) a point from the first point cloud that is representative of a first depth estimate and (b) a point from the third point cloud that is representative of a second depth estimate and (ii) a second subset of facets that include (a) a point from the first point cloud that is representative of a first depth estimate or (b) a point from the third point cloud that is representative of a second depth estimate. For each facet included in the first subset, the inspection platform can establish that the first depth estimate agrees with the second depth estimate and then assign the first and second depth estimate as the height. For each facet included in the second subset, the inspection platform can compute the height based on either the first depth estimate or second depth estimate. As mentioned above, there may be facets that do not include any points in the first and third point clouds. Because these facets are not associated with any depth estimates, the inspection platform may discard these facets as unreliable.

Then, the inspection platform can identify facets in the faceted image for which confidence in the estimated height exceeds a threshold (step 2208). Confidence in the estimated height may depend on the number and type of depth estimates associated with the corresponding facet. For example, the inspection platform may have sufficiently high confidence in the estimated height of a given facet if (ii) the given facet is included in the first subset or (ii) the given facet is located along a path to another facet included in the first subset, where variation in the estimated height along the path is roughly consistent. The variation in the estimated height may be considered roughly consistent if the absolute variation (e.g., between adjacent facets or across the entire path) remains beneath a predetermined threshold, if the estimated heights across the entire path are deemed statistically comparable (e.g., by an algorithm designed to measure statistical similarity), etc.

For each identified facet, the inspection platform can determine a homography based on its estimated height (step 2209). Since the homography is based on height, identified facets corresponding to flat surfaces along different elevations may have different homographies. The inspection platform can then project the pixels of each identified facet onto an overhead DEM based on the homographies, so as to generate an overhead view of at least part of the interior space (step 2210). Normally, the pixels of each identified facet are independently projected onto the overhead DEM in the form of a separate projection. Therefore, the overhead DEM may include various "layers" of pixels that are overlapped on top of one another from lowest to highest height in a hierarchical stack (also referred to as an "elevational stack").

As mentioned above, these steps as images of the interior space are generated, such that the images are handled in a pairwise manner. Such an approach will result in the inspection platform populating the overhead DEM with pixels from different images over time.

FIG. 23 includes a flow diagram of a process 2300 for sequentially examining images of an interior space in order to iteratively develop a top-down view of the interior space. Initially, an inspection platform may receive input that is indicative of a request from a user to generate a top-down view of an interior space (step 2301). Step 2301 of FIG. 23 may be substantially similar to step 2201 of FIG. 22. Then, the inspection platform may instruct the user to pan the computing device across the interior space, so as to generate a series of images of the interior space (step 2302). Generally, the series of images will capture different portions of the interior space from different locations, orientations, etc. For example, the inspection platform may instruct the user to centrally position herself in the interior space and then remain stationary while panning the computing device. As another example, the inspection platform may instruct the user to position herself in different locations from which one or more images may be generated.

The inspection platform can then obtain a first series of point clouds by providing the series of images to an AR framework executing on the computing device as input (step 2303). Step 2303 of FIG. 23 may be substantially similar to step 2203 of FIG. 22, except that here the inspection platform may provide the series of images—either sequentially or simultaneously—as input to the AR framework. Moreover, the inspection platform can generate a second series of point clouds by monitoring movement of an array of points across successive digital images in the series of digital images (step 2304). As discussed above, the point cloud that is generated for a given image may be based on how much movement is observed by the points in the array between the given image and another image generated after the given image. While this other image must be generated after the given image, this other image need not necessarily be generated immediately after the given image. Thus, the inspection platform could compare images that are immediately adjacent one another, or the inspection platform could compare images that are separated by some number (e.g., one or more) of images.

For each image in the series of images, the inspection platform can divide that image into facets so as to generate a series of faceted images (step 2305), and then the inspection platform can estimate the heights of the facets in each faceted image based on (i) the corresponding point cloud in the first series of point clouds and (ii) the corresponding point cloud in the second series of point clouds (step 2306). Moreover, the inspection platform may project at least some pixels included in that image onto an overhead DEM based on the estimated heights (step 2307). More specifically, the inspection platform may project the pixels included in each image that are contained in facets that have been determined to be accurate. Normally, the pixels included in each facet correspond to a substantially planar surface of a physical feature of the interior space or an object contained in the interior space. After the guided modeling operation is complete, the inspection platform may store the top-down view of the interior space in a data structure that is associated with the interior space. The inspection platform may determine that the guided modeling operation is complete in response to discovering that the user stopped panning the computing device or selected a digital element that is visible on interface generated by the computing device. Alternatively, the inspection platform may determine that the guided modeling operation is complete in response to discovering that at least a predetermined percentage (e.g., 80, 90, or 98 percent) of the interior space has been mapped onto the overhead DEM.

Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

Additional steps may also be included in some embodiments. For example, when a top-down view of an interior space is generated in accordance with the processes 2200, 2300 of FIGS. 22-23, the inspection platform may populate the top-down view onto an interface for review by the user. This may be done in near real time as the inspection platform estimates the heights of individual facets, such that the user is able to visually establish which portions of the interior space have not been properly imaged. As another example, the inspection platform could utilize the top-down model of the interior space to calculate, infer, or otherwise determine measurements (e.g., of the interior space or objects contained therein) and then store these measurements in a data structure that is associated with the interior space.

As another example, multiple top-down views could be generated in accordance with the processes 2200, 2300 of FIGS. 22-23 via different scans, and then the inspection platform could merge these top-down views. For example, a user may want to scan two interior spaces (e.g., adjacent rooms in a home). These interior spaces could be scanned one at a time, so as to independently produce two top-down views. The inspection platform can then find matching visual features between the two top-down views (e.g., table corners, door edges, floor patterns) and merge the two top-down views based on these matching visual features. This allows the user to create larger multi-room DEMs without having to capture all of the interior spaces in a single scan.

Processing System

Figure 24:
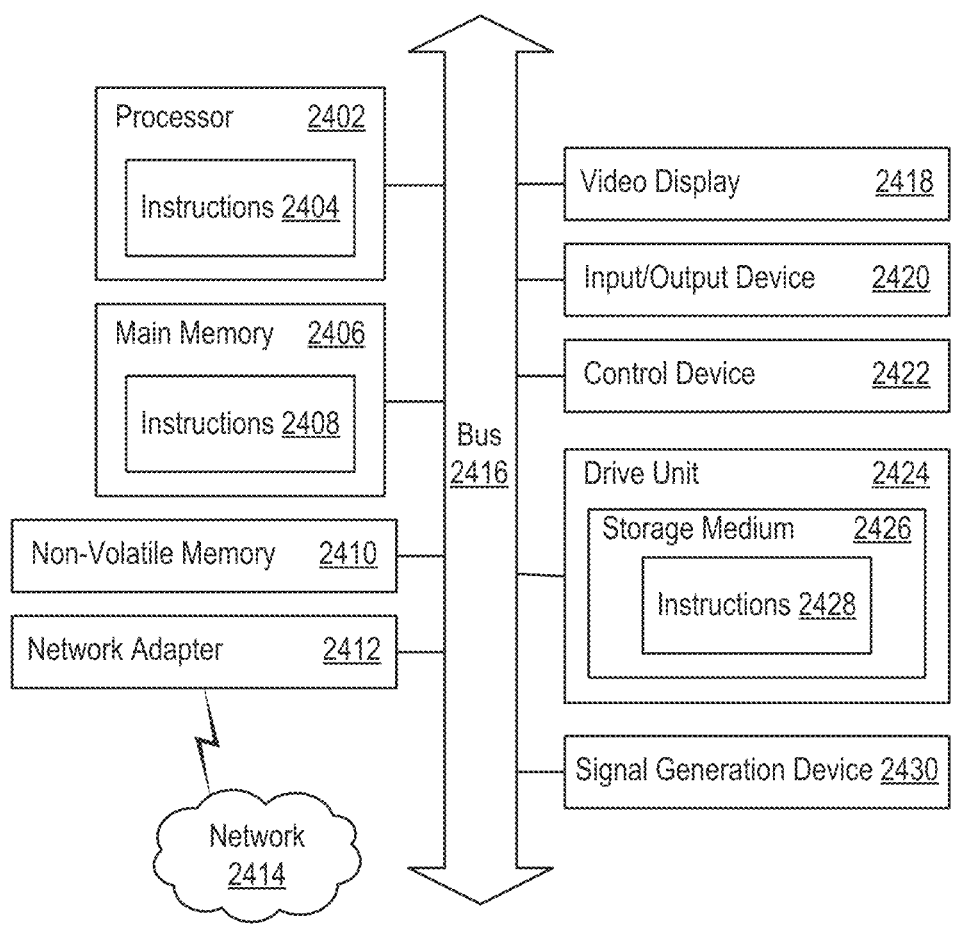
FIG. 24 is a block diagram illustrating an example of a processing system in which at least some operations described herein can be implemented.

FIG. 24 is a block diagram illustrating an example of a processing system 2400 in which at least some operations described herein can be implemented. For example, components of the processing system 2400 may be hosted on a computing device that includes an inspection platform, or components of the processing system 2400 may be hosted on a computing device with which images of an interior space are captured.

The processing system 2400 may include a central processing unit ("processor") 2402, main memory 2406, non-volatile memory 2410, network adapter 2412, video display 2418, input/output device 2420, control device 2422 (e.g., a keyboard or pointing device), drive unit 2424 including a storage medium 2426, and signal generation device 2430 that are communicatively connected to a bus 2416. The bus 2416 is illustrated as an abstraction that represents one or more physical buses or point-to-point connections that are connected by appropriate bridges, adapters, or controllers. The bus 2416, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), inter-integrated circuit ($I^2C$) bus, or an Institute of Electrical and Electronics Engineers (IEEE) standard 1394 bus (also referred to as "Firewire").

While the main memory 2406, non-volatile memory 2410, and storage medium 2426 are shown to be a single medium, the terms "machine-readable medium" and "storage medium" should be taken to include a single medium or multiple media (e.g., a centralized/distributed database and/or associated caches and servers) that store one or more sets of instructions 2428. The terms "machine-readable medium" and "storage medium" shall also be taken to include any medium that is capable of storing, encoding, or carrying a set of instructions for execution by the processing system 2400.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 2404, 2408, 2428) set at various times in various memory and storage devices in a computing device. When read and executed by the processors 2402, the instruction(s)

cause the processing system 2400 to perform operations to execute elements involving the various aspects of the present disclosure.

Further examples of machine- and computer-readable media include recordable-type media, such as volatile memory devices and non-volatile memory devices 2410, removable disks, hard disk drives, and optical disks (e.g., Compact Disk Read-Only Memory (CD-ROMS) and Digital Versatile Disks (DVDs)), and transmission-type media, such as digital and analog communication links.

The network adapter 2412 enables the processing system 2400 to mediate data in a network 2414 with an entity that is external to the processing system 2400 through any communication protocol supported by the processing system 2400 and the external entity. The network adapter 2412 can include a network adaptor card, a wireless network interface card, a router, an access point, a wireless router, a switch, a multilayer switch, a protocol converter, a gateway, a bridge, bridge router, a hub, a digital media receiver, a repeater, or any combination thereof.

REMARKS

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method implemented by a computer program executing on a computing device, the method comprising:
    receiving input that is indicative of a request to generate an overhead view of an interior space;
    instructing a user to pan a camera of the computing device across the interior space, so as to generate at least two digital images of the interior space,
        wherein the at least two digital images include a first digital image and a second digital image that is generated after the first digital image;
    obtaining a first point cloud by providing the first digital image to an augmented reality (AR) framework executing on the computing device;
    generating a second point cloud by monitoring movement of an array of points across the first and second digital images;
    dividing the first digital image into facets, so as to generate a faceted digital image,
        wherein each facet includes pixels that are determined to correspond to a comparable height relative to the camera;
    estimating a height of each facet in the faceted digital image based on the first and second point clouds;
    identifying facets for which confidence in the estimated height exceeds a threshold;
    determining a homography for each identified facet based on the estimated height; and
    projecting pixels of each identified facet onto the overhead view of the interior space based on the homography.

2. The method of claim 1, wherein the second point cloud has a higher density of points than the first point cloud.

3. The method of claim 1, wherein said obtaining is performed in near real time as the camera is panned across the interior space.

4. The method of claim 1, further comprising:
    obtaining a third point cloud by providing the second digital image to the AR framework executing on the computing device.

5. The method of claim 4,
    wherein upon receiving the first digital image as input, the AR framework produces, as output, (i) the first point cloud and (ii) a first spatial coordinate indicative of position of the camera when the first digital image was generated, and
    wherein upon receiving the second digital image as input, the AR framework produces, as output, (i) the third point cloud and (ii) a second spatial coordinate indicative of position of the camera when the second digital image was generated.

6. The method of claim 5, wherein said generating comprises:
    for each point included in the array of points,
        determining a spatial position by tracking movement of the point across the first and second digital images and then computing the spatial position based on (i) the movement, (ii) the first spatial coordinate, and (iii) the second spatial coordinate.

7. The method of claim 1, wherein said dividing comprises:
    applying, to the first digital image, a neural network that is trained to estimate depth in order to produce a depth map,
    identifying discontinuities in depth based on an analysis of the depth map, and
    performing segmentation based on the discontinuities so as to define boundaries of the facets.

8. The method of claim 7, wherein the depth map indicates, on a per-pixel basis, a distance from the camera as determined from analysis of the first digital image.

9. The method of claim 1, wherein a boundary of each facet is representative of a visual discontinuity or a depth discontinuity.

10. The method of claim 1, wherein said estimating comprises:
classifying the facets by identifying
a first subset of facets that include (i) a point from the first point cloud that is representative of a first depth estimate and (ii) a point from the second point cloud that is representative of a second depth estimate,
a second subset of facets that include either (i) a point from the first point cloud that is representative of a first depth estimate or (ii) a point from the second point cloud that is representative of a second depth estimate,
for each facet included in the first subset,
establishing that the first depth estimate agrees with the second depth estimate, and
assigning the first and second depth estimate as the estimated height,
for each facet included in the second subset,
computing the estimated height based on the first depth estimate or the second depth estimate.

11. The method of claim 10, wherein confidence in the estimated height of a given facet exceeds the threshold if the given facet is (i) in the first subset or (ii) along a path to another facet in the first subset where variation in the estimated height along the path is below a threshold.

12. The method of claim 11, wherein the pixels of each identified facet are projected onto the overhead view of the interior space in the form of separate projections, and wherein said projecting comprises:
sorting the projections from lowest to highest estimated height in a hierarchical stack.

13. A non-transitory computer-readable medium with instructions stored thereon that, when executed by a processor of a computing device, cause the computing device to perform operations comprising:
receiving input that is indicative of a request to generate an overhead view of an interior space;
instructing a user to pan a camera of the computing device across the interior space, so as to generate a series of digital images of the interior space;
obtaining a first series of point clouds by providing the series of digital images to an augmented reality (AR) framework executing on the computing device as input;
generating a second series of point clouds by monitoring movement of an array of points across successive digital images of the series of digital images;
for each digital image in the series of digital images,
dividing the digital image into facets, each of which includes pixels that are determined to correspond to a comparable height relative to the camera;
estimating heights of the facets based on (i) the corresponding point cloud in the first series of point clouds and (ii) the corresponding point cloud in the second series of point clouds; and
projecting at least some pixels included in the digital image onto the overhead view of the interior space based on the heights estimated for the facets.

14. The non-transitory computer-readable medium of claim 13, wherein each point cloud in the first series of point clouds is associated with a corresponding point cloud in the second series of point clouds but has a lower density of points than the corresponding point cloud.

15. The non-transitory computer-readable medium of claim 13, wherein the array of points is in the form of a uniform grid.

16. The non-transitory computer-readable medium of claim 15, wherein the pixels included in each facet correspond to a substantially planar surface of a physical feature of the interior space or an object contained in the interior space.

17. The non-transitory computer-readable medium of claim 16, further comprising:
for each digital image in the series of digital images,
identifying facets for which confidence in the heights exceeds a threshold; and
determining homographies for the identified facets.

18. The non-transitory computer-readable medium of claim 17, wherein the homography determined for each identified facet is based solely on relative vertical distance between the camera and the corresponding substantially planar surface.

19. The non-transitory computer-readable medium of claim 13,
wherein each digital image in the series of digital images has multiple channels of values that are representative of different colors,
wherein the method further comprises:
for each digital image in the series of digital images,
generating a depth map that has a single channel of values that are representative of depth; and
appending the single channel of values to the multiple channels of values, so as to form a composite digital image;
wherein said dividing is performed over the composite digital image.

20. The non-transitory computer-readable medium of claim 13,
wherein each digital image in the series of digital images has multiple channels of values that are representative of different colors,
wherein the method further comprises:
for each digital image in the series of digital images,
generating a depth map that has a single channel of values that are representative of depth; and
creating a hybrid digital image in a synthetic color space by blending the single channel of values and the multiple channels of values;
wherein said dividing is performed over the hybrid digital image.

* * * * *